United States Patent
Ono et al.

(10) Patent No.: US 7,167,559 B2
(45) Date of Patent: Jan. 23, 2007

(54) INFORMATION SECURITY DEVICE, EXPONENTIATION DEVICE, MODULAR EXPONENTIATION DEVICE, AND ELLIPTIC CURVE EXPONENTIATION DEVICE

(75) Inventors: Takatoshi Ono, Aichi-ken (JP); Natsume Matsuzaki, Mino (JP); Toshihisa Nakano, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 855 days.

(21) Appl. No.: 10/105,480

(22) Filed: Mar. 25, 2002

(65) Prior Publication Data
US 2002/0172356 A1 Nov. 21, 2002

(30) Foreign Application Priority Data
Mar. 28, 2001 (JP) ............................. 2001-092482

(51) Int. Cl.
*H04K 1/00* (2006.01)

(52) U.S. Cl. ....................................... 380/28; 713/174
(58) Field of Classification Search ................. 380/28, 380/30, 44, 200, 201, 255, 277; 726/2; 713/1, 713/2, 188, 194, 174
See application file for complete search history.

(56) References Cited

U.S. PATENT DOCUMENTS 6,021,201 A * 2/2000 Bakhle et al. .............. 713/189
2002/0172356 A1* 11/2002 Ono et al. .................... 380/28

FOREIGN PATENT DOCUMENTS

JP         5274279        10/1993

* cited by examiner

*Primary Examiner*—Kim Vu
*Assistant Examiner*—Joseph Pan

(57) ABSTRACT

In an exponentiation device, a relatively large table is generated outside of a coprocessor so as to enable high-speed exponentiation to be performed using the small window method. The selection of data from the table and transfer of data to the coprocessor are conducted in parallel with a multiple-length arithmetic operation performed in the coprocessor. So as to avoid bottlenecks occurring in the data transfer between a CPU and the coprocessor, two data banks are provided in the coprocessor for storing the data to be used in the arithmetic operation. By providing two banks in the coprocessor, it is possible to use one for transferring data while data stored in the other is being used in the arithmetic operation. When the operation using the stored data has been completed, the banks are switched, and the arithmetic operation is then repeated using the newly transferred data while at the same time conducting data transfer in readiness for the following operation.

18 Claims, 14 Drawing Sheets

INFORMATION SECURITY DEVICE, EXPONENTIATION DEVICE, MODULAR EXPONENTIATION DEVICE, AND ELLIPTIC CURVE EXPONENTIATION DEVICE

This application is based on unexamined patent application publication 2001-092482 filed in Japan, the content of which is hereby incorporated by reference.

BACKGROUND OF THE INVENTION

1. Field of the Invention

The present invention relates to information security technology for performing exponentiation operations, modular exponentiation operations, and elliptic curve exponentiation operations.

2. Related Art

The widespread use of electronic data transmission resulting from developments in computer and communications technology has led to the increasing application of such technology as secret communications and digital signatures.

A secret communication system allows communications to be conducted between related parties without the communicated content being revealed to third parties. A digital signature system enables the receiver to authenticate the communicated content and verify the sender.

Both of these systems employ a cryptosystem known as public key cryptography. Public key cryptography provides a convenient method for managing a large number of separate encryption keys and is considered indispensable for communications involving many users. According to this system different keys are used for encryption and decryption, the encryption key being public and the decryption key remaining secret.

The Discrete Logarithm Problem

The security in public key cryptography is based on the intractability of the discrete logarithm problem. Commonly used discrete logarithms included those over finite fields and elliptic curves.

The discrete logarithm problem over a finite field assumes that GF is a finite field, and b and y are elements of GF. The discrete logarithm problem for GF is then to determine a value x such that:

$$b^x = y$$

where x is an integer (when it exists).

The discrete logarithm problem over an elliptic curve assumes that E is an elliptic curve defined over GF, G is a base point lying on E, and Y is a new point lying on E.

The discrete logarithm problem for GF is then to determine a value x such that:

$$Y = x*G$$

where x is an integer (when it exists).

The symbol "*" represents the multiple addition of the base point lying on the elliptic curve. For example, x*G represents the addition of a base point G to itself x times, or:

$$x*G = G+G+G+G+\ldots+G$$

The discrete logarithm problem is employed in the security of public key cryptosystems because of the computational difficulties involved in determining the value of x with respect to a finite field GF(p) having a large number of bases. Related issues are discussed in detail in Neal Koblitz, *A Course in Number Theory and Cryptography*, Springer-Verlag, 1987.

Exponentiation and Elliptic Curve Exponentiation

When the discrete logarithm problem is used as the basis for security in public key cryptography, two types of arithmetic operations are employed, those being exponentiation and elliptic curve exponentiation.

A well known method of performing exponentiation and elliptic curve exponentiation is the binary method described by D. E. Knuth in *Seminumerical Algorithms: The Art of Computer Programming, Volume Two* ($3^{rd}$ ed., Reading, Mass.: Addison-Wesley, 1997, c.1969).

Known refinements to the standard binary algorithm include the small window method (also described in Knuth above) and the signed binary method (see F. Morain, J. Olivos, "Speeding up the computations on an elliptic curve using addition-subtraction chains," in *Theoretical Informatics and Applications*, vol. 24, no. 6, 1990).

Further refinements to the signed binary method are disclosed in unexamined patent application publications 7-49769 and 2000-330470 filed in Japan.

Binary Method

The following is a description of the prior art binary method, using modular exponentiation as an example.

In order to calculate $A^k$ using the binary method, a modular exponentiation result is obtained by performing (i) n−1 modular squarings and (ii) modular multiplications such that $k_i = 1$. In this calculation exponent k is represented in binary, giving $k_{n-1} k_{n-2} \ldots k_i \ldots k_1 k_0$ where $n > i \geq 0$ and $k_i = 0$ or 1.

According to the binary method, the variable i, which is an index showing which bits to investigate, is initially assigned a value n−1 where k is represented in binary. Also, a variable X, which will ultimately store the modular exponentiation result, is assigned an initial value of 1. Modulus n represents the bit size when k is represented in binary.

The following steps are then repeatedly performed while subtracting 1 from the value of variable i per repetition until i=0 (i=n−1, n−2, . . . , 1, 0).

Step 1: $X = X^2$ (modular square X and assign the result to X)
Step 2: $X = X \times A$ only when $k_i = 1$ (modular multiply X by A and assign the result to X)

When the repetitions have been completed, the resulting value $A^k$ is stored in X.

Small Window Method

The following description relates to another prior art method, the small window method.

The first step in calculating $A^k$ using this method is the same as the binary method: the variables X and i are assigned initial values of 1 and n−1, respectively. The equation $m = 2^{w-1}$ is then calculated where W is a window size, and a table based on A is formulated that includes $A_0, A_1, \ldots, A_{m-1}$. Here, $A_0, A_1, \ldots, A_{m-1}$ are calculated as follows.

$A_0 = A$ $A_1 = A^3$

. . .

$A_{m-1} = A^{2m-1}$

Next, the binary expression $k_i$ of the exponent k is converted to $k'_i$. Here, $k_i$ has a value of 0 or 1, and $k'_1$ has a value of 0, 1, . . . m−1.

Taking a three-bit sequence $k_{t+2}$, $k_{t+1}$, $k_t$ (the value of $k_{t+2}$, $k_{t+1}$, $k_t$ each being 0 or 1) in the binary expression ... $k_i$ $k_{i-1}$ ... $k_1$ $k_0$ of exponent k as an example, the three bits are expressed collectively as $k'_t$. Thus, $k'_t=011=3$ when $k_{t+2}=0$, $k_{t+1}=1$, $k_t=1$. Although this example is described in terms of being a conversion process using a three-bit sequence, it is actually window size that is used to conduct the conversion.

Next, the following steps are performed while subtracting 1 from variable i per repetition until i=0 (i=n−1, n−2, ... , 1, 0)

Step 1: $X=X^2$ (modular square X and assign the result to X)

Step 2: $X=X \times Ak'_i$ only when $k'_i \neq 0$ (modular multiply X by $Ak'_i$ and assign the result to X)

When the repetitions have been completed, the resulting value $A^k$ is stored in X.

The small window method is a well-known means of performing high-speed modular exponentiation because it allows for a reduction in the number of modular multiplications in comparison to the binary method.

Other prior art methods will not be discussed here due to their similarity with the two methods given above; namely, they also determine the exponent and perform modular multiplication and modular squaring on the determined value of the exponent.

Exemplary Structure of a Modular Exponentiation Device

The following description relates to a known modular exponentiation device for performing modular exponentiation using the above prior art arithmetic operation methods.

The modular exponentiation device is composed of a general-purpose microprocessor CPU, a RAM, and other elements.

The CPU, in addition to executing controls, performs modular multiplication and modular squaring. The RAM stores computer programs, table data, and calculation results. The computer programs are for executing the above binary method or small window method, and the CPU performs the binary method or the small window method in accordance with the computer programs.

In this extremely simple structure the CPU performs all of the arithmetic operations. The processing speeds of this simple structure are slow as a result of there being no specialized control circuits or calculation circuits.

A Variation of the Modular Exponentiation Device

The structure of this variation is different from the known modular exponentiation device discussed above. Instead of a general-purpose CPU, the device described here employs a coprocessor to perform the modular exponentiation, the coprocessor being capable of executing a number of dedicated operations at high speed. Thus, in addition to the general-purpose microprocessor CPU, this modular exponentiation device is characterized by including a coprocessor for conducting dedicated arithmetic operations.

In this device the CPU notifies the coprocessor to commence the operations. The coprocessor includes a control unit for controlling the other element of the device, a calculation unit for performing the modular exponentiation, a table data storage unit of storing the various table data, and a calculation result storage unit for storing the calculation results.

The control unit selects from the table data storage unit the data to be used for calculations in the calculation unit and transfers the selected data to the calculation unit. The calculation unit performs modular squarings and modular multiplications using the table data selected by the control unit and the calculation results stored in the calculation result storage unit, and stores the results of the calculations in the calculation result storage unit.

As described above, the coprocessor includes elements for storing the table data and the calculation results. This structure is adopted because the internal memory of the coprocessor is able to access the data faster than the external RAM when the control unit requires the data.

The separation of the control unit and the calculation unit in this structure allows for the operations to be performed at high speed. However, it is necessary to provide a table data storage unit accessible by the calculation unit, thus requiring the coprocessor to have a large internal memory.

Also, since the coprocessor is responsible for all the computation processing, the function of the CPU is limited to notifying the coprocessor to initiate the operations. The CPU, therefore, plays no part in the modular exponentiation operations performed by the coprocessor.

A Further Variation of the Modular Exponentiation Device

The following description relates to a further variation of the modular exponentiation device. This device is composed of a general-purpose microprocessor CPU and a coprocessor for performing dedicated arithmetic operations. The coprocessor includes a control unit, two calculation units (first and second calculation units), a table data storage unit for storing table data, and a calculation result storage unit for storing calculation results. The coprocessor operates the two calculation units in parallel.

The control unit selects data to be used in the calculations performed in the first calculation unit from the table data storage unit, and transfers the data to the first calculation unit. The first calculation unit performs modular multiplications using the table data selected by the control unit and the calculation results stored in the calculation result storage unit, and stores the results of the calculations in the calculation result storage unit. The second calculation unit performs modular squarings on the calculation results stored in the calculation result storage unit, and stores the results of the calculations in the calculation result storage unit.

By separating the calculation unit into first and second calculation units and having the two calculation units operate in parallel, it is possible for this device to perform the operations even faster than the above modular exponentiation device. As in the above device, the coprocessor in this structure is responsible for all the computation processing, and the CPU is only required to notify the coprocessor to initiate the operations. Thus the CPU plays no part in the modular exponentiation operations performed by the coprocessor. Naturally, the fact of there being two calculation units necessitates an increase in coprocessor circuitry.

As demonstrated above, a modular exponentiation device that relies on the CPU to perform all the arithmetic operations is unable to achieve an adequate operating frequency, resulting in the slow performance of the modular exponentiation calculations. The operating frequency can be improved by introducing a coprocessor to perform dedicated operations, although the coprocessor then requires a large internal memory.

Using the binary method, which only requires a small memory capacity, instead of the small window method, which needs a voluminous table, helps to reduce the memory requirements. The problem now is the relative computational slowness of the binary method in comparison to the small window method.

The speed at which modular exponentiation is performed according to the binary method can be improved by operating two coprocessors in parallel, although this problematically requires a doubling of the coprocessor circuitry.

SUMMARY OF THE INVENTION

In view of the issues discussed above, an objective of the present invention is to provide (i) an information security device, (ii) devices, methods, and computer programs for performing exponentiation, modular exponentiation, and elliptic curve exponentiation, and (iii) a storage medium for storing the computer programs. Provision of the above allows for the execution of high-speed power operation methods such as the small window method, and does not require increases in either coprocessor circuitry or memory capacity.

The above objective can be achieved by an information security device that securely and reliably manages predetermined information based on the intractability of the discrete logarithm problem in a group by performing a power operation k & A. In this device, the group is formed from a predetermined set and a binary operation performed using elements of the set, the power operation k & A involves k number of repetitions of the binary operation performed using the element A of the group and the identity element of the group, and the discrete logarithm problem is to determine the element k, when k exists, such that an element Y=k & A in the group.

Furthermore, the device includes (i) an initializing unit for storing the identity element as an initial value in a variable X and a variable $B_2$, (ii) a repetition control unit for controlling a calculation unit, a storage unit, and an exchange unit to repeat, for the number of bits in a bit sequence resulting when the element k is represented in binary, a step composed of the respective operations of calculating, storing, and exchanging, so as to perform the power operation k & A, the result of the power operation k & A being stored in the variable X at the completion of the repetitions, (iii) the calculation unit for performing the binary operation using the variable X and the same variable X, performing the binary operation again using the initial binary operation result and an operand stored in the variable $B_2$, and storing the further binary operation result in the variable X, (iv) the storage unit for selecting an operand to be used by the calculation means in the following step and storing the selected operand in a variable $B_1$, the operation conducted by the storage means being completed during a duration of the operation conducted by the calculation means, and (v) the exchange unit for exchanging the operand in the variable $B_2$ for the operand in the variable $B_1$ when the operations conducted by the calculation means and the storage means have been completed.

This structure of the invention allows for the operation conducted by the storage unit to be carried out in parallel with the operation conducted by the calculation unit, while at the same time executing the high-speed power operation method. High-speed power operations can be achieved as a result.

Furthermore, the storage unit can include (i) a selection subunit for preventing the selection of the operand when a section of the bit sequence of k conforms to a predetermined bit sequence pattern, and (ii) a data storage subunit for preventing the storage of a selected operand in the variable $B_1$ when the selection subunit has prevented the selection of the operand. Then in the following step when the data storage subunit has prevented the storage of an operand in the variable $B_1$, the calculation unit can perform the binary operation using the variable X and the same variable X, perform the binary operation again using the initial binary operation result and the identity element, and store the further binary operation result in the variable X.

This structure of the invention allows for the binary operation performed by the coprocessor to be conducted in parallel with the data transfer between the CPU and the coprocessor, while at the same time reducing the access capacity of the coprocessor. High-speed power operations can be achieved as a result.

BRIEF DESCRIPTION OF THE DRAWINGS

These and other objects, advantages, and features of the invention will become apparent from the following description thereof taken in conjunction with the accompanying drawings that illustrate specific embodiments of the present invention.

In the drawings.

DETAILED DESCRIPTION OF THE PREFERRED EMBODIMENTS

1. First Embodiment

The following description relates to a digital signature system 1 as a first embodiment of the present invention.

1.1 Structure of Digital Signature System 1

Digital signature system 1 employs the DSA signature scheme, the security of which is based on the intractability of the elliptic curve discrete logarithm problem.

Figure 1:
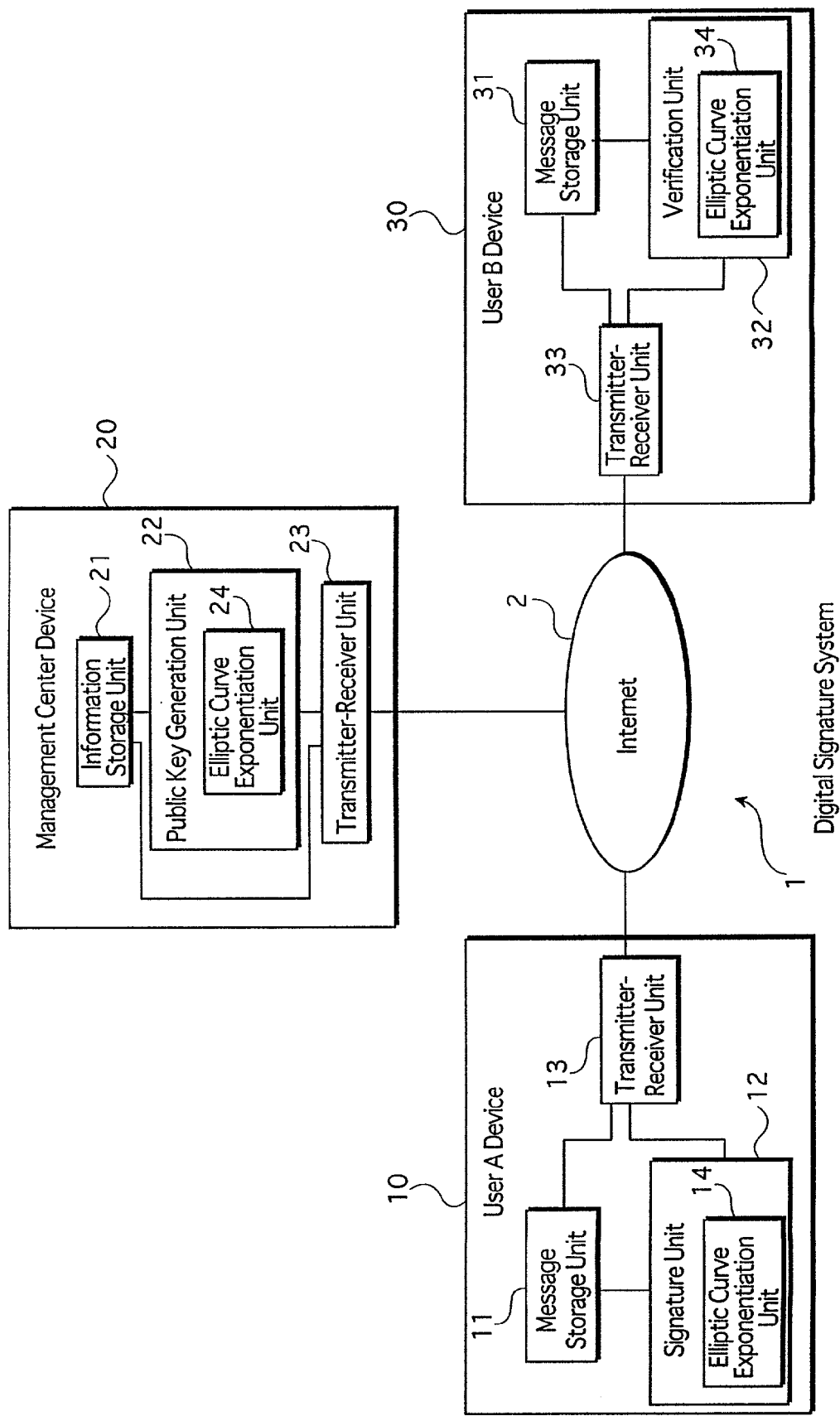
FIG. 1 is a block diagram showing a structure of a digital signature system 1 according to a first embodiment of the present invention.

As shown in FIG. 1, system 1 is composed of a user A device 10, a management center device 20, and a user B device 30. Devices 10, 20, and 30 are connected to each other via the Internet 2.

Management center device 20 stores the secret key of user A device 10, uses the stored secret key of device 10 to generate a public key, and makes the generated public key available to user B device 30.

In order to transmit a message to device 30 via the Internet 2, device 10 generates a signature using its secret key. The signature is then sent together with the message to device 30 via the Internet 2. Device 30 receives the message and signature from device 10, and uses the public key to verify that the message was sent from device 10.

(1) Structure of Management Center Device 20

As shown in FIG. 1, device 20 is composed of an information storage unit 21, a public key generation unit 22, and a transmitter-receiver unit 23. An elliptic curve exponentiation unit 24 is included in unit 22.

Information Storage Unit 21

For the purposes of this specification, p is a prime, E is an elliptic curve defined over a finite field GF(p), G is a base point lying on E, and q is an order of E. As such, q is the smallest positive integer that satisfies the equation:

$$q*G=0$$

where 0 is the point at infinity and has x,y coordinates of ($\infty$, $\infty$). "0" functions as the zero element in addition operations when the elliptic curve is determined to be a group.

Unit 21 stores the secret key $X_A$ Of user A (having previously received notification of the secret key $X_A$ from user A), prime p, the parameters of elliptic curve E, base point G, and order q.

Public Key Generation Unit 22

Unit 22 reads secret key $X_A$, prime p, elliptic curve E parameters, base point G, and order q from information storage unit 21.

Elliptic curve exponentiation unit 24 included in unit 22 uses the read secret key $X_A$ to generate a public key $Y_A$ of user A such that:

$$Y_A=X_A*G$$

The operation performed is an elliptic curve exponentiation on elliptic curve E defined over finite field GF(p).

Unit 22 then outputs the generated public key $Y_A$ to transmitter-receiver unit 23.

Transmitter-receiver Unit 23

Unit 23 reads prime p, elliptic curve E parameters, base point G, and order q from information storage unit 21, and transmits them to devices 10 and 30 via the Internet 2. Management center device 20 thereby makes public prime p, elliptic curve E parameters, base point G, and order q.

Also, unit 23 receives public key $Y_A$ from public key generation unit 22 and transmits the received public key to user B device 30 via the Internet 2.

(2) Structure of User A Device 10

As shown in FIG. 1, device 10 is composed of a message storage unit 11, a signature unit 12, and a transmitter-receiver unit 13. An elliptic curve exponentiation unit 14 is included in unit 12.

Message Storage Unit 11

Unit 11 stores a message $m_e$ to be sent to user B device 30.

Signature Unit 12

Unit 12 receives output of prime p, elliptic curve E parameters, base point G, and order q from transmitter-receiver unit 13.

Unit 12 then reads message $m_e$ from message storage unit 11, and also generates a random number $r_0$.

Next, unit 12 calculates:

$$R_1=(r_x, r_y)=r_0*G$$

The operation here involves an elliptic curve exponentiation on the elliptic curve E defined over finite field GF(p).

Unit 12 then determines s such that:

$$s \times r_0 = m_e + r_x \times X_A \pmod{q}$$

Unit 12 then outputs the calculated values of $R_1$ and s to transmitter-receiver unit 13.

Transmitter-receiver Unit 13

Unit 13 receives transmission of prime p, elliptic curve E parameters, base point G, and order q from management center device 20, and outputs them to signature unit 12.

Unit 13 receives output of $R_1$ and s from signature unit 12, and reads message me from message storage unit 11.

Unit 13 also transmits message $m_e$ and ($R_1$, s) as a signature to user B device 30 via the Internet 2.

(3) Structure of User B Device 30

As shown in FIG. 1, device 30 is composed of a message storage unit 31, a verification unit 32, and a transmitter-receiver unit 33. An elliptic curve exponentiation unit 34 is included in unit 32.

Message Storage Unit 31

Unit 31 has an area for storing message $m_e$.

Transmitter-Receiver Unit 33

Unit 33 receives transmission of prime p, elliptic curve E parameters, base point G, order q, and public key $Y_A$ from management center device 20 via the Internet 2, and outputs them to verification unit 32.

Unit 33 also receives transmission of message $m_e$ and signature ($R_1$, s) from user A device 10 via the Internet 2. Unit 33 then writes message $m_e$ into message storage unit 31 and outputs signature ($R_1$, s) to verification unit 32.

Verification Unit 32

Unit 32 receives output of prime p, elliptic curve E parameters, base point G, order q, public key $Y_A$, and signature ($R_1$, s) from transmitter-receiver unit 33.

Unit 32 then judges whether the following equation holds true:

$$s*R_1=m_e*G+r_x*Y_A$$

This operation includes an elliptic curve exponentiation on the elliptic curve E defined over finite field GF(p). Elliptic curve exponentiation unit 34 included in unit 32 performs the elliptic curve exponentiation.

If this equation holds true, then user A device 10 is verified as being the transmitter of message $m_e$. If the equation does not hold true, then user A device 10 is not verified as the transmitter of message $m_e$.

The above equation is derived as follows:

$$s * R_1 = \{((m_e + r_x \times x_A)/r_0) \times r_0\} * G$$
$$= (m_e + r_x \times x_A) * G$$
$$= m_e * G + (r_x \times x_A) * G$$
$$= m_e * G + r_x * Y_A$$

1.2 Operation of Digital Signature System 1

Figure 2:
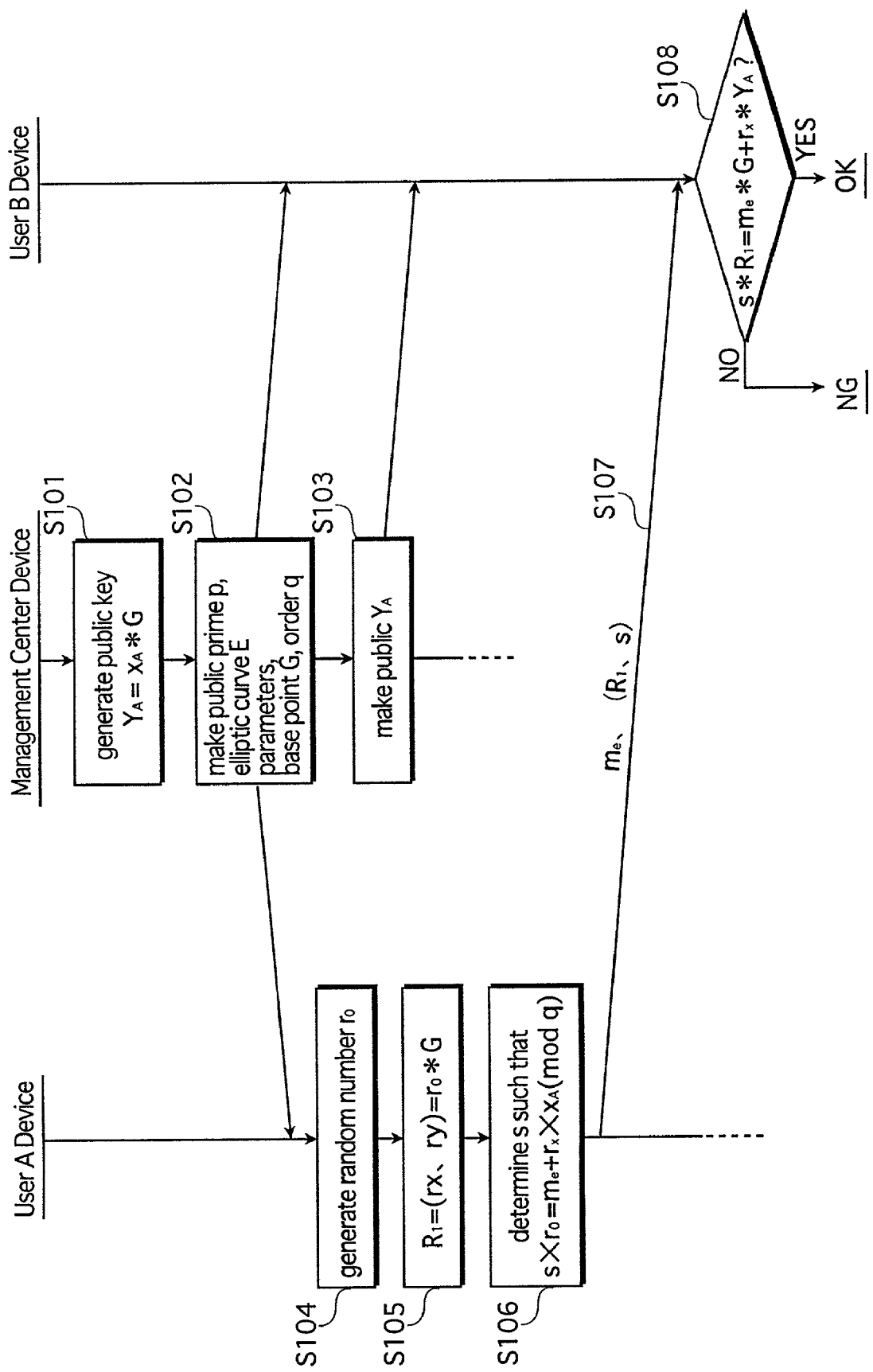
FIG. 2 is a flowchart showing the digital signature operations conducted by digital signature system 1.

The operation of digital signature system 1 is described with reference to the flowchart in FIG. 2.

Elliptic curve exponentiation unit 24 in public key generation unit 22 of management center device 20 uses secret key $X_A$ to generate public key $Y_A$ of user A (step S101). Transmitter-receiver unit 23 in device 20, makes prime p, elliptic curve E parameters, base point G, and order q public by transmitting them to devices 10 and 30 via the Internet 2 (step 102). Unit 23 also makes public key $Y_A$ of device 10 public by transmitting it to user B device 30 via the Internet 2 (step S103).

Next, signature unit 12 in user A device 10 generates a random number $r_0$ (step S104), calculates $R_1=(r_x, r_y)=r_0*G$, (step S105), and determine s such that $s \times_{r_0}=m_e+r_x \times x_A$ mod q (step S106) Transmitter-receiver unit 13 in device 10 then transmits message $m_e$ and signature ($R_1$, s) to user B device 30 via the Internet 2 (step S107).

Next, transmitter-receiver unit 33 in device 30 receives transmission of message $m_e$ and signature ($R_1$, s) from device 10 via the Internet 2 (step S107). Then in order to verify whether the transmitter of message $m_e$ was in fact user A device 10, verification unit 32 in device 30 judges whether the equation $s*R_1=m_e*G+r_x*Y_A$ holds true (step S108)

1.3 Detailed Structure of User A device 10

The following detailed description relates to user A device 10, and focuses particularly on the structure of elliptic curve exponentiation unit 14.

Unit 14 as described below performs an elliptic curve exponentiation k*A, and assigns the result of the operation to variable X.

Also, since elliptic curve exponentiation units 24 and 34 in devices 20 and 30, respectively, are structurally related to unit 14, a description of units 24 and 34 has been omitted.

Figure 3:
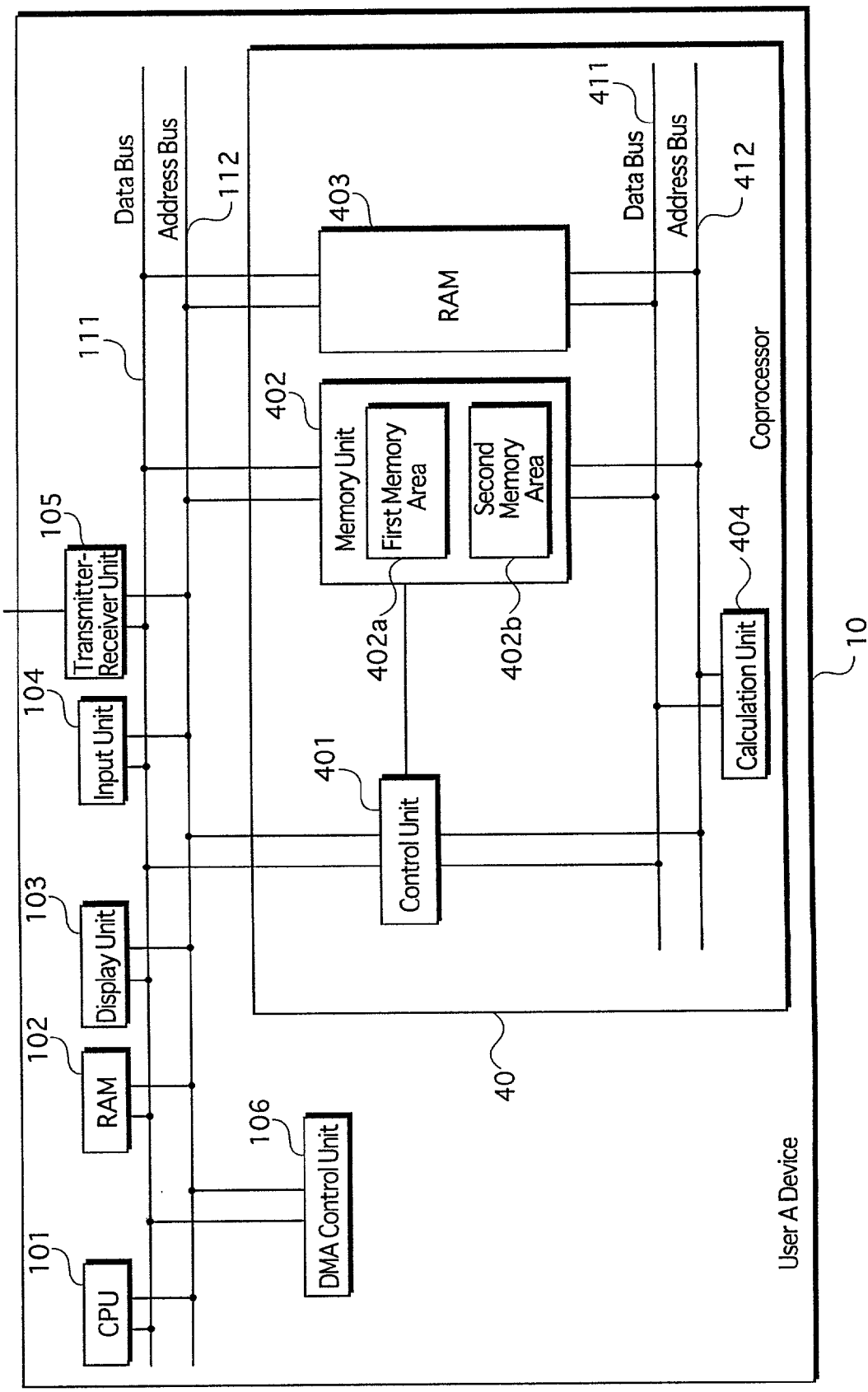
FIG. 3 is a block diagram showing a structure of a user A device 10.

As shown in FIG. 3, user A device 10 is composed of a a CPU 101, a RAM 102, a display unit 103, an input unit 104, a transmitter-receiver unit 105, a direct memory access (DMA) control unit 106, a coprocessor 40, a data bus 111, and an address bus 112. CPU 101, RAM 102, and units 103, 104, 105, 106 and 40, are connected to each other via data bus 111 and address bus 112.

Coprocessor 40 includes a control unit 401, a memory unit 402, a RAM 403, a calculation unit 404, a data bus 411, and an address bus 412. Units 401, 402 and 404, and RAM 403, are connected to each other via data bus 411 and address bus 412.

In addition, control unit 401, memory unit 402, and RAM 403 are also connected to data bus 111 and address bus 112.

Elliptic curve exponentiation unit 14 is composed of CPU 101, RAM 102, DMA control unit 106, coprocessor 40, data bus 111, and address bus 112. Unit 14 functions by means of CPU 101 and coprocessor 40 operating in accordance with a computer program.

(1) RAM 102

RAM 102 is composed of a readable/writable semiconductor memory.

RAM 102 stores elliptic curve exponentiation value k and calculation value A used in the elliptic curve exponentiation X=k*A. Take, for example, bit lengths of 160 and 480 bits, respectively, for k and A. A 480-bit length is determined for A because it is possible to improved the efficiency of the calculation on the elliptic curve by using an expanded three-dimensional coordinate system for A.

Areas are allocated in RAM 102 by CPU 101, and these allocated areas are used by CPU 101.

(2) CPU 101

CPU 101 is a general-purpose microprocessor and operates in accordance with a computer program stored in RAM 102. The following description relates to the operations of CPU 101.

In order to perform the elliptic curve exponentiation k*A, CPU 101 initially executes the following initialization procedures (i) to (iii).

(i) CPU 101 outputs an initialization instruction to coprocessor 40 via data bus 111 and address bus 112.

(ii) CPU 101 assigns a value n−1 to variable i. Variable i is an index used to control the repetitions of elliptic curve exponentiation k*A. CPU 101 allocates a storage area for variable i in RAM 102. Alternatively, it is possible to allocate a storage area for variable i in one of the resistors included in CPU 101.

The value n is a bit number showing the length of the area needed to store k.

Also, a zero value is assigned to the variables $k_{n+1}$, $k_n$, $k_{-1}$, $k_{-2}$.

(iii) CPU 101 allocates an area in RAM 102 for storing variables $A_0, A_1, A_2, \ldots, A_{m-1}$. Each of variables $A_0, A_1, A_2, \ldots, A_{m-1}$ has a 480-bit length.

CPU 101 calculates $m=2^{w-1}$ and 3*A, 5*A, . . . , (2m−1)*A where W is a window size. CPU 101 then assigns the results of A, 3*A, 5*A, . . . , (2m−1)*A respectively to variables $A_0, A_1, A_2, \ldots, A_{m-1}$, stored in RAM 102.

Next, CPU 101 repeats the following steps (i) to (iv) while subtracting 1 from variable i per repetition until i =n−1 becomes i=0.

(i) CPU 101 converts $k_i$ to $k'_i$ (note: conversion process described in greater detail below)

Here, as described in relation to the prior art, $k_i$ takes the value of the $i^{th}$ bit from the bottom of the bit sequence of k where k is represented in binary, and $k'_i$ represents a collective plurality of $k_i$ values. In other words, the value of $k_i$ is 0 or 1, and the value of $k'_i$ is one of 0, 1, . . . , m−1. Also, $m=2^{w-1}$ where w is a window size.

(ii) CPU 101 outputs a DMA transfer instruction to DMA control unit 106 via data bus 111 and address bus 112.

(iii) CPU 101 outputs a calculation instruction to coprocessor 40 via data bus 111 and address bus 112.

(iv) CPU 101 receives output of a calculation completion notification from coprocessor 40 via data bus 111 and address bus 112.

When the repetitions have been completed, CPU 101 reads, as the result of the elliptic curve exponentiation k*A, variable X stored in RAM 403, and writes this result into a specified area in RAM 102.

(3) DMA Control Unit 106

Unit 106 receives output of the transfer instruction from CPU 101 via data bus 111 and address bus 112.

On receipt of the transfer instruction, unit 106 transfers $Ak'_j$ stored in RAM 102 to memory unit 402 of coprocessor 40 in order to set the value of variable $B_1$ stored in memory unit 402 such that:

$$B_1 = Ak'_i$$

However, if $k'_i=0$ then $B_1=0$.

When $B_1$ has been set, unit 106 outputs a transfer completion notification to coprocessor 40.

(4) RAM 403

RAM 403 is composed of a readable/writable semiconductor memory. RAM 403 includes an area for storing variable X. This area has a 480-bit length.

(5) Control Unit 401

Unit 401 receives output of the initialization instruction and the calculation instruction from CPU 101. Unit 401 also receives output of the transfer completion notification from DMA control unit 106.

On receipt of the initialization instruction, unit 401 sets the value of variable X stored in RAM 403 to 0, and the value of variable $B_2$ stored in memory unit 402 to 0.

On receipt of the calculation instruction, unit 401 outputs a calculation instruction to calculation unit 404. Unit 401 also receives the calculation completion notification outputted from calculation unit 404.

On receipt of the calculation completion notification and the transfer completion notification, unit 401 outputs a memory switch instruction to memory unit 402, and then outputs a calculation completion notification to CPU 101.

(6) Memory Unit 402

Unit 402 is composed of a first memory area 402a and a second memory area 402b.

Area 402a is connected to either buses 111 and 112 or buses 411 and 412. Area 402b is also connected to either buses 111 and 112 or buses 411 and 412.

If area 402a is connected to buses 111 and 112, then area 402b is connected to buses 411 and 412. This is referred to as "connection condition 1."

Conversely, if area 402a is connected to buses 411 and 412, then area 402b is connected to buses 111 and 112. This is referred to as "connection condition 2."

Unit 402 receives output of the memory switch instruction from control unit 401.

If unit 402 is in connection condition 1 when the memory switch instruction is received, then unit 402 switches from connection condition 1 to connection condition 2.

On the other hand, if unit 402 is in connection condition 2 when the memory switch instruction is received, then unit 402 switches from connection condition 2 to connection condition 1.

One of variables $A_0, A_1, A_2, \ldots, A_{m-1}$ is stored in a variable storage area in first memory area 402a, this area being indicated by a specific address. One of the variables $A_0, A_1, A_2, \ldots, A_{m-1}$ is also stored in a variable storage area in second memory area 402b, this area being indicated by the same address as used to store the variable in first memory unit 402a.

When unit 402 is in connection conditions 1 or 2, the variable stored in the variable storage area of the memory area connected to buses 111 and 112 is referred to as $B_1$, and the variable stored in the variable storage area of the memory area connected to buses 411 and 412 is referred to as $B_2$.

(7) Calculation Unit 404

Unit 404 receives output of the calculation instruction from control unit 401.

On receipt of the calculation instruction, unit 404 reads variable X from RAM 403, calculates 2*X, and overwrites variable X with the result. Next, unit 404 reads variable X from RAM 403, calculates $X+B_2$, and overwrites variable X with the result.

When this calculation has been completed, unit 404 outputs a calculation completion notification to control unit 401.

1.4 Detailed Operation of User A Device 10

Figure 4:
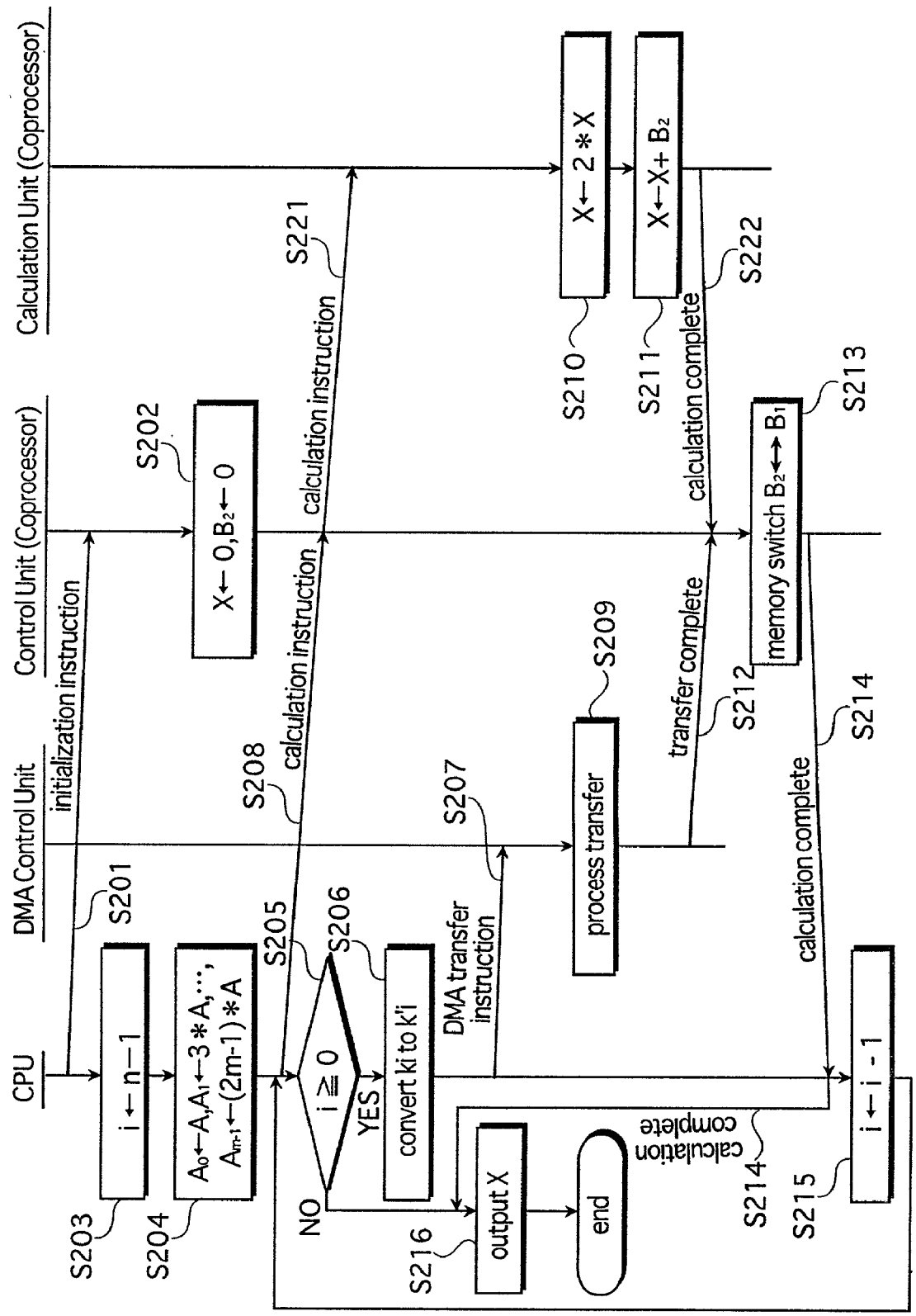
FIG. 4 is a flowchart showing the operations when elliptic curve exponentiation is performed by a CPU, a DMA control unit, and a coprocessor included in user A device 10.
Figure 5:
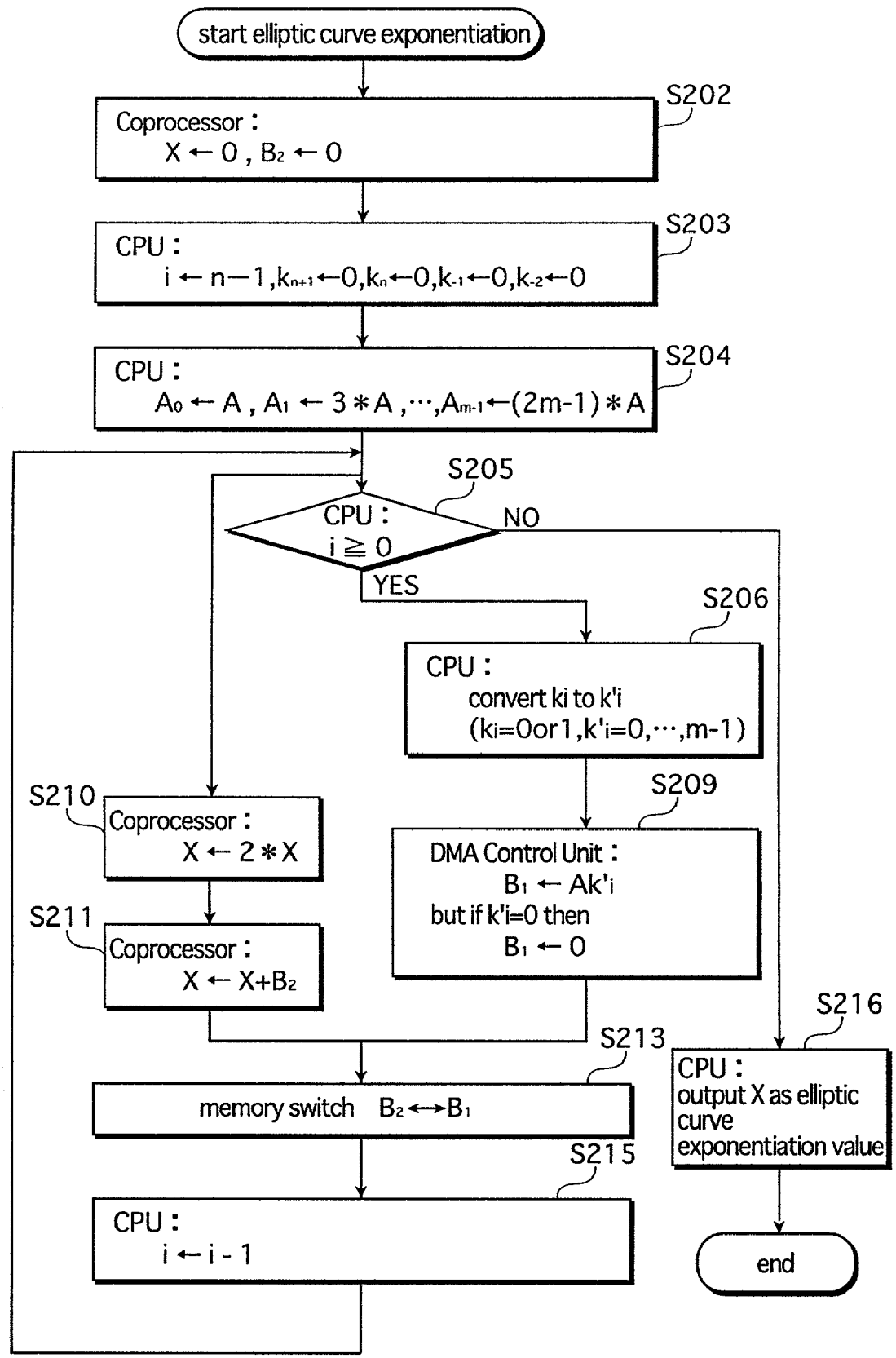
FIG. 5 is a flowchart showing the operations when elliptic exponentiation is performed by user A device 10.

The following detailed description relates the operation of user A device 10, and focuses in particular on the operation of elliptic curve exponentiation unit 14, with reference to the flowcharts in FIGS. 4 and 5.

The flowchart in FIG. 4 shows the operations of the individual elements included in unit 14, and the flowchart in FIG. 5 shows the overall operation of unit 14.

CPU 101 outputs an initialization instruction to coprocessor 40 via data bus 111 and address bus 112 (step S201).

On receipt of the initialization instruction, control unit 401 in coprocessor 40 sets the value of variable X stored in RAM 403 to 0 and the value of variable $B_2$ stored in memory unit 402 to 0 (step S202).

CPU 101 assigns a value of n−1 to variable i and a value of 0 to variables $k_{n+1}, k_n, k_{-1}, k_{-2}$ (step S203). Next, CPU 101 allocates an area in RAM 102 for storing variables $A_0, A_1, A_2, \ldots, A_{m-1}$, calculates $m=2^{w-1}$ and 3*A, 5*A, …, (2m−1)*A, and assigns the results of A, 3*A, 5*A, …, (2m−1)*A, respectively to $A_0, A_1, A_2, \ldots, A_{m-1}$ stored in RAM 102, (step S204).

CPU 101 then outputs a calculation instruction to coprocessor 40 via data bus 111 and address bus 112 (step S208).

Next, CPU 101 judges whether $i \geq 0$, and if "yes" (step S205), then CPU 101 converts $k_i$ to $k'_i$ (step S206) and outputs a DMA transfer instruction to DMA control unit 106 via data bus 111 and address bus 112 (step S207).

On receipt of the DMA transfer instruction from CPU 101 (step S207), DMA control unit 106 sets the value of variable $B_1$ stored in memory unit 402 of coprocessor 40 by transferring $Ak'_i$ stored in RAM 102 to memory unit 402 via data bus 111 and address bus 112. However, if $k'_i=0$, then $B_1=0$ (step S209). When $B_1$ has been set, unit 106 outputs a transfer completion notification to control unit 401 in coprocessor 40 (step S212).

On receipt of the calculation instruction from CPU 101 (step S208), control unit 401 outputs a calculation instruction to calculation unit 404 (step S221). Calculation unit 404 then calculates X=2*X (step S210) and $X=X+B_2$ (step S211), and outputs a calculation completion notification to control unit 401 when the calculations have been completed (step S222).

On receipt of the transfer completion notification and calculation completion notification (steps S212 and S222), control unit 401 outputs a memory switch instruction to memory unit 402, and memory unit 402 switches to connection condition 2 when the current condition is connection condition 1, and to connection condition 1 when the current condition is connection condition 2 (step S213). Next, control unit 401 outputs a calculation completion notification to CPU 101 (step S214).

CPU 101 then subtracts 1 from value of variable i (step S215), and returns to step S205 to repeat the process.

On the other hand, if CPU 101 judges that i<0 (step S205), then CPU 101 receives a calculation completion notification (step S214), reads the value of variable X stored in RAM 403 as the result of the exponentiation k*A, writes the read result into a specified area of RAM 102 (step S216), and ends the calculation process.

Figure 6:
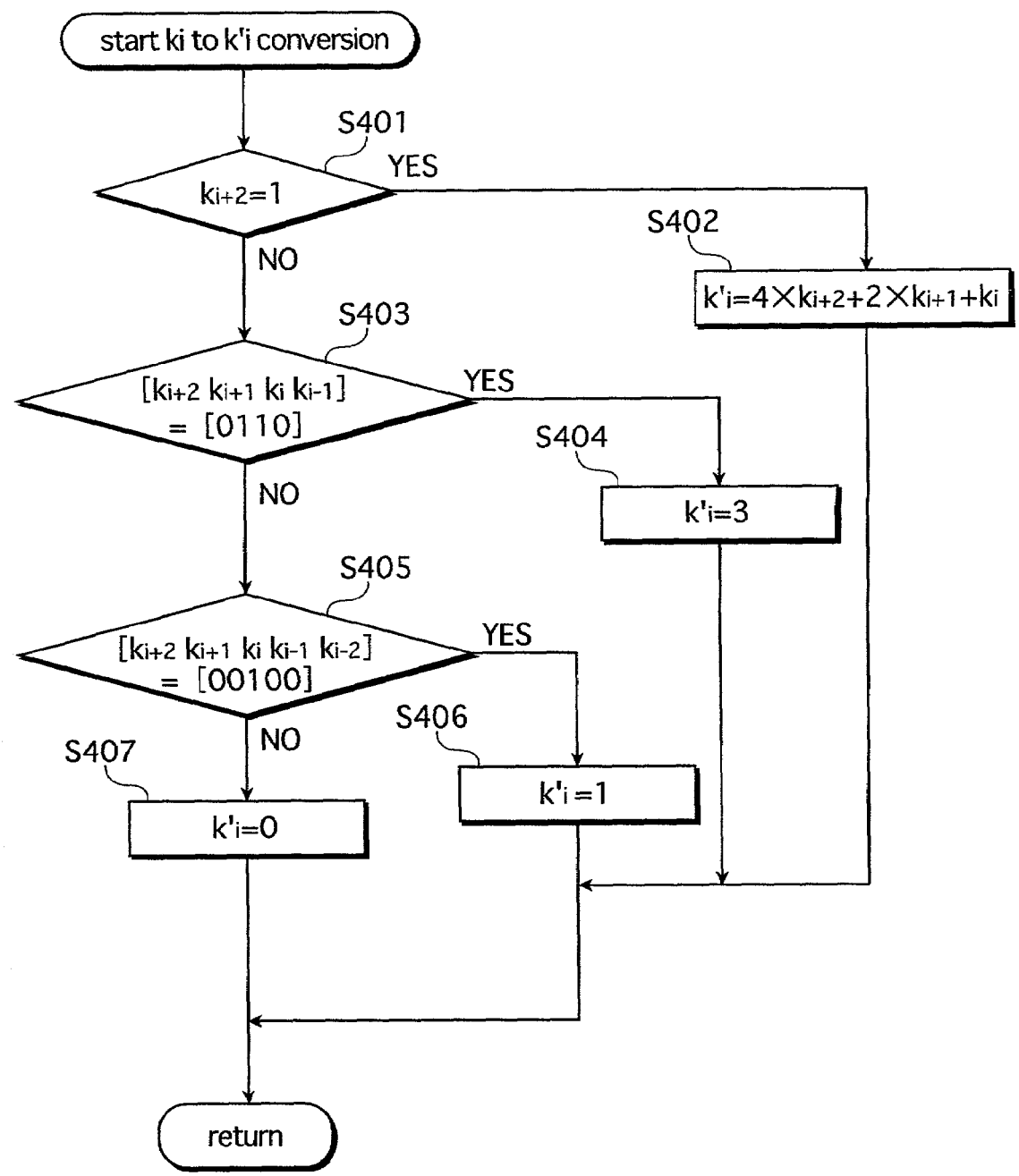
FIG. 6 is a flowchart showing in detail the conversion of $k_i$ to $k'_i$.

The following detailed description relates to the conversion of $k_i$ to $k'_i$ in step S206, with reference to the flowchart in FIG. 6.

Here, $k=[k_{n-1}k_{n-2} \ldots k_1 k_0]$ is converted to $k'=[k'_{n-1}k'_{n-2} \ldots k'_1 k'_0]$. $k'_{n-1}, k_{n-2}, \ldots, k'_1, k'_0$ each have 3-bit length.

Furthermore, the values $k_{n-1}, k_{n-2}, \ldots, k_1$, and $k_0$ are each either 0 or 1, and $k=2_{n-1} \times k_{n-1}+2_{n-2} \times k_{n-2}+\ldots +2_1 \times k_1+k_0$. The values of $k'_{n-1}, k'_{n-2}, \ldots, k'_1, k'_0$ are 0, 1, 3, . . . , 7, respectively.

If $k_{i+2}=1$ (step S401), then CPU 101 calculates $k'_i=4 \times k_{i+2}+2 \times k_{i+1}+k_i$ (step S402) and ends the conversion process.

If $k_{i+2} \neq 1$ (step S401), and $[k_{i+2} \ k_{i+1} \ k_i \ k_{i-1}]=[0110]$ (step S403), then CPU 101 determines that $k'_i=3$ (step S404), and ends the conversion process.

If $k_{i+2} \neq 1$ (step S401), $[k_{i+2} \ k_{i+1} \ k_i \ k_{i-1}] \neq [0110]$ (step S403), and $[k_{i+2} \ k_{i+1} \ k_i \ k_{i-1} \ k_{i-2}]=[00100]$ (step S405), then CPU 101 determines that $k'_i=1$ (step S406), and ends the conversion process.

If $k_{i+2} \neq 1$ (step S401), $[k_{i+2} \ k_{i+1} \ k_i \ k_{i-1}] \neq, [0110]$ (step S403), and $[k_{i+2} \ k_{i+1} \ k_i \ k_{i-1} \ k_{i-2}] \neq [00100]$ (step S405), then CPU 101 determines that $k'_i=0$ (step S407), and ends the conversion process.

1.5 Evaluation of Calculations Preformed by Elliptic Curve Exponentiation Unit 14

Figure 7:
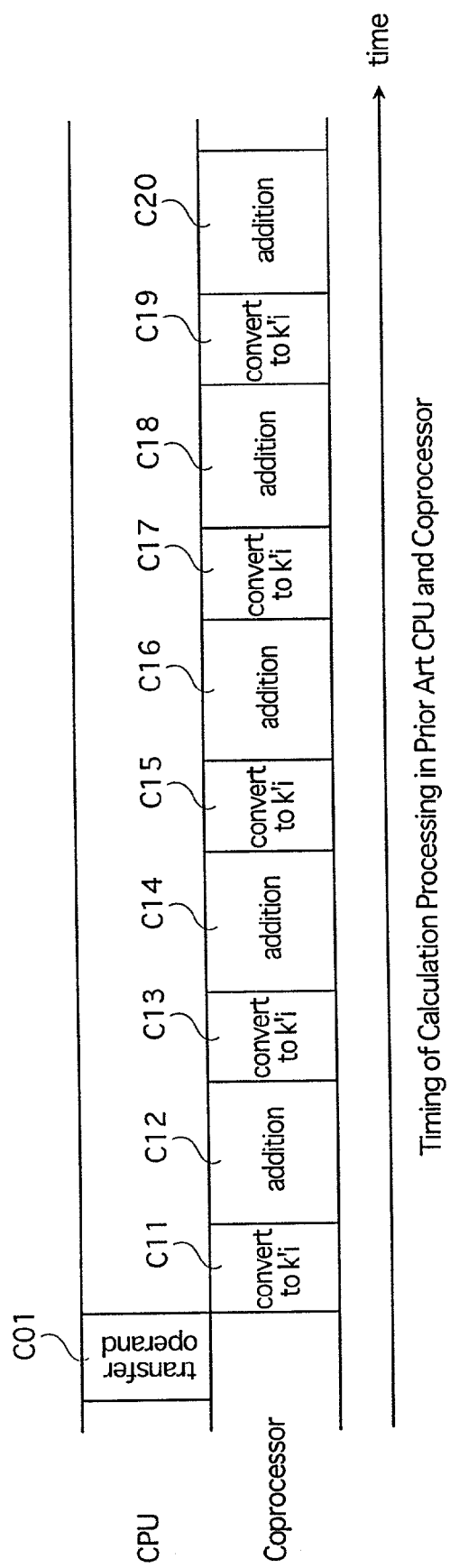
FIG. 7 is a timechart showing the timing of calculation processing carried out by a prior art CPU and coprocessor.

As shown in FIG. 7, in a prior art elliptic curve exponentiation device, the CPU transfers the operand to a memory area in the coprocessor (C01). The coprocessor then converts $k_i$ to $k'_1$ (C11) and performs an addition operation on the elliptic curve (C12). The conversion of $k_i$ to $k'_i$ and the addition operation are then repeated.

Figure 8:
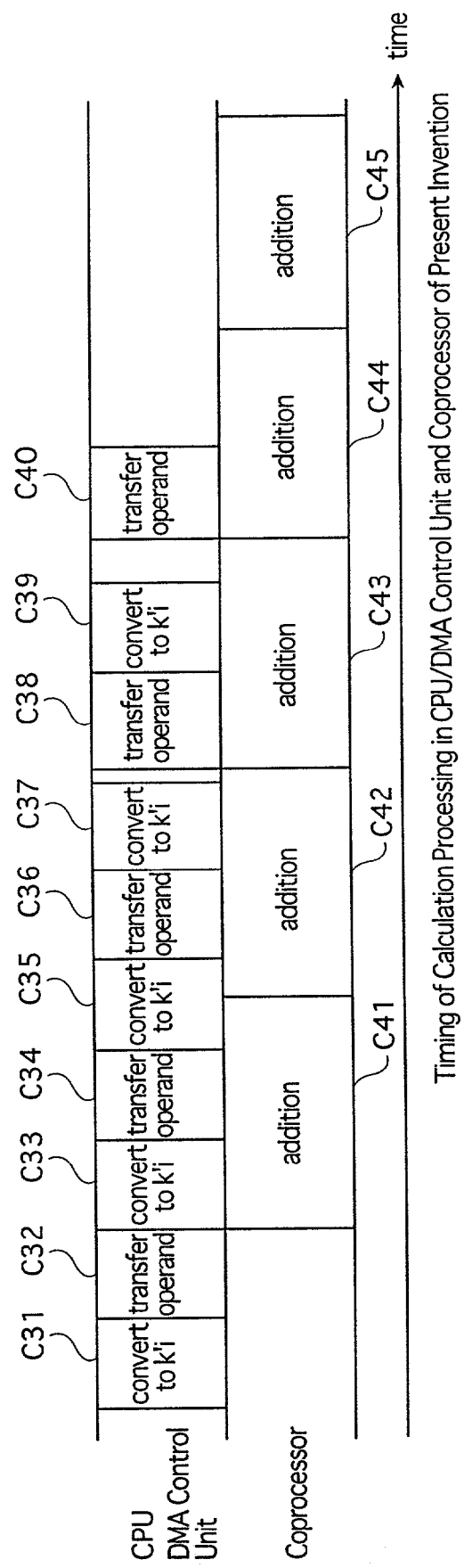
FIG. 8 is a timechart showing the timing of calculation processing carried out by the CPU, the DMA control unit, and the coprocessor included in user A device 10.

As shown in FIG. 8 in comparison, in elliptic curve exponentiation unit 14 of the present invention, CPU 101 converts $k_i$ to $k'_i$ (C31) and DMA control unit 106 transfers the operand a variable $B_1$ stored in a memory area of coprocessor 40 (C32).

Next, CPU 101 converts $k_i$ to $k'_i$ (C33) and DMA control unit 106 transfers the operand to variable $B_1$ stored in a memory area of coprocessor 40 (C34), while at the same time coprocessor 40 performs an addition operation on the elliptic curve using variable $B_2$ in the memory area (C41)

The transfer of the operand to $B_1$ by unit 106 and the addition operation using $B_2$ by coprocessor 40 are performed in parallel from then on.

Because the transfer and addition operations are performed in parallel, elliptic curve exponentiation unit 14 of the present invention allows the total calculation time to be reduced in comparison to the prior art elliptic curve exponentiation device.

2. Second Embodiment

The following description relates to a key sharing system 1b as a further embodiment of the present invention.

2.1 Structure of Key Sharing System 1b

Figure 9:
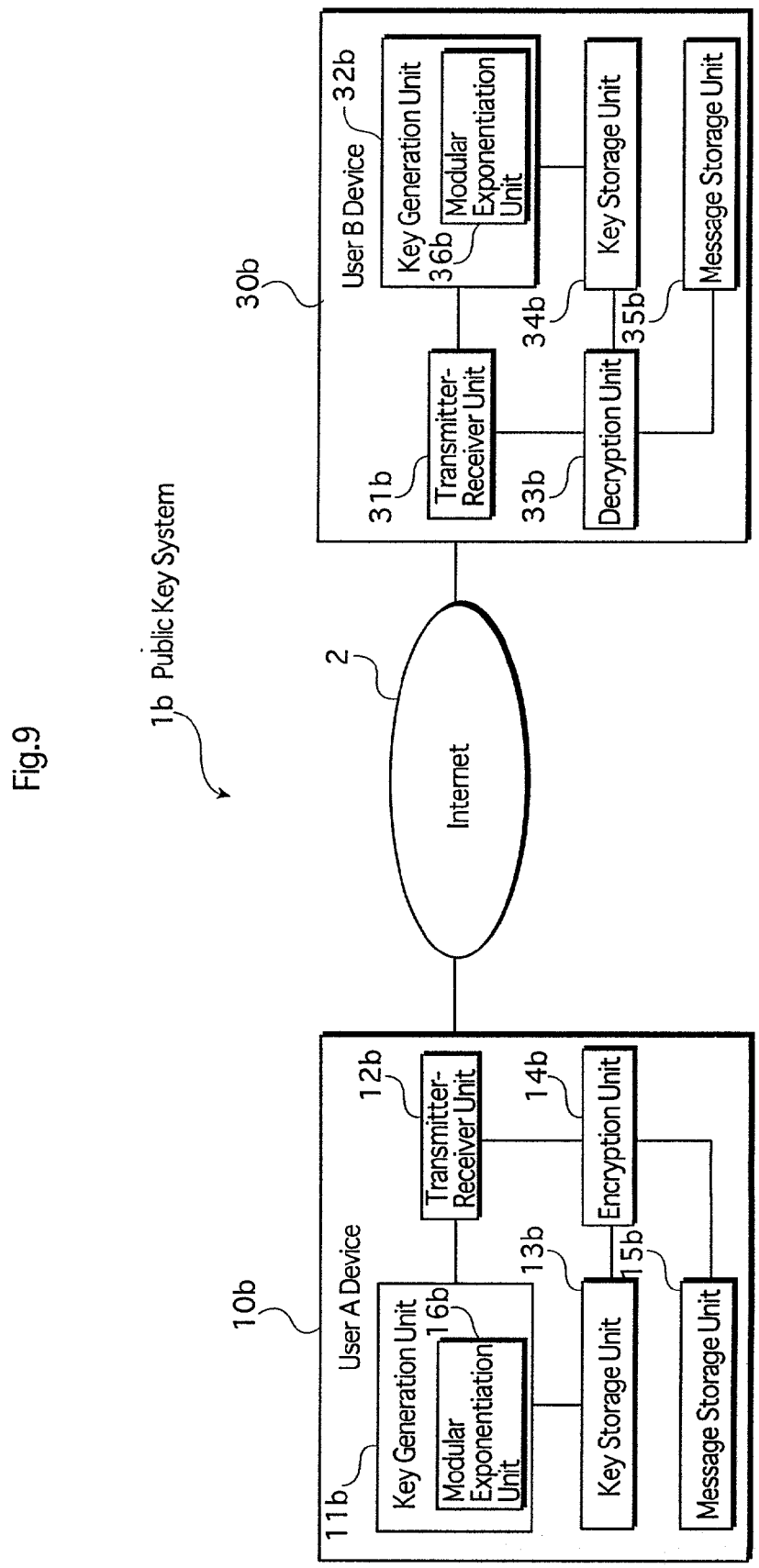
FIG. 9 is a block diagram showing a structure of a key sharing system 1b according to a further embodiment of the present invention.

As shown in FIG. 9, key sharing system 1b, the security of which is based on the intractability of the discrete logarithm problem for a finite field, is composed of a user A device 10b and a user B device 30b. Device 10b and 30b are connected to each other via the Internet 2.

Device 10b and 30b each store their own secret key. Public keys for each of device 10b and 30b are generated using the respective secret keys, and the respective public keys i are sent to the other device (that is, device 10b public key to device 30b and vice versa). Then, using the public key of the other device, devices 10b and 30b each generate a single shared key.

Secret communication of messages between devices 10b and 30b can thereafter be conducted using the shared key.

(1) Structure of User A Device 10b

As shown in FIG. 9, device 10b is composed of a key generation unit 11b, a transmitter-receiver unit 12b, a key storage unit 13b, an encryption unit 14b, and a message storage unit 15b.

Key Storage Unit 13b

Unit 13b stores a secret key $X_A$ of user A device 10b. Unit 13b further includes areas for storing public key $Y_A$ of user A device 10b and a shared key F of devices 10b and 30b.

Key Generation Unit 11b

Unit 11b includes a modular exponentiation unit 16b.

Unit 11b reads secret key $X_A$ from key storage unit 13b and generates public key $Y_A$ using secret key $X_A$ such that:

$$Y_A = \alpha ** X_A \bmod p$$

where $\alpha$ and p are predetermined integers. The operator  indicates an exponentiation operation. For example, A k represents $A^k$.

The calculation of the above equation is performed by unit 16b.

Next, unit 11b sends the generated public key $Y_A$ to device 30b via transmitter-receiver unit 12b and the Internet 2.

Unit 11b also receives transmission of public key $Y_B$ from user B device 30b via the Internet 2 and unit 12b. Unit 11b then uses the transmitted public key $Y_B$ to generate shared key F such that:

$$F = Y_B ** X_A \bmod p \hspace{2em} \text{(equation 1)}$$
$$= \alpha ** (X_A \ X_B) \bmod p$$

The calculation of the above equation is performed by unit 16b.

Next, unit 11b writes the generated shared key F into key storage unit 13b.

Message Storage Unit 15b

Unit 15b stores a message to be sent to device 30b.

Encryption Unit 14b

Unit 14b reads the message from message storage unit 15b and shared key F from key storage unit 13b.

Then, unit 14b generates an encrypted message derived from shared key F by implementing an encryption algorithm with respect to the message, and transmits the encrypted message to device 30b via transmitter-receiver unit 12b and the Internet 2.

(2) Structure of User B Device 30b

As shown in FIG. 9, device 30b is composed of a transmitter-receiver unit 31b, a key generation unit 32b, a decryption unit 33b, a key storage unit 34b, and a message storage unit 35b.

Key Storage Unit 34b

Unit 34b stores a secret key $X_B$ of device 30b. Unit 34b further includes areas for storing public key $Y_B$ of device 30b and shared key F of devices 10b and 30b.

Key Generation Unit 32b

Unit 32b includes a modular exponentiation unit 36b.

Unit 32b reads secret key $X_B$ from key storage unit 34b and uses the read secret key $X_B$ to generate public key $Y_B$ such that:

$$Y_B = \alpha ** X_B \bmod p$$

where $\alpha$ and p are predetermined integers. The operator ** indicates an exponentiation operation.

The calculation of the, above equation is performed by unit 36b.

Next, unit 32b sends the generated public key $Y_B$ to user A device 10b via transmitter-receiver unit 31b and the Internet 2.

Unit 32b also receives transmission of public key $Y_A$ from device 10b via the Internet 2 and unit 31b. Unit 32b then uses the transmitted public key $Y_A$ to generate shared key F such that:

$$F = Y_A ** X_B \bmod p \quad \text{(equation 2)}$$
$$= \alpha ** (X_A X_B) \bmod p$$

The calculation of the above equation is performed by unit 36b.

Next, unit 32b writes the generated shared key F into key storage unit 34b.

Message Storage Unit 35b

Unit 35b stores the encrypted message sent from device 10b.

Decryption Unit 33b

Unit 33b receives transmission of the encrypted message from device 10b via the Internet 2 and transmitter-receiver unit 31b. Unit 33b also reads shared key F from key storage unit 34b.

Then, unit 33b generates a decrypted message derived from shared key F by implementing a decryption algorithm with respect to the encrypted message.

The decryption algorithm referred to here is an algorithm for performing an inversion of the encryption algorithm.

Unit 33b then writes the decrypted message into message storage unit 35b.

2.2 Operation of Key Sharing System 1b

Figure 10:
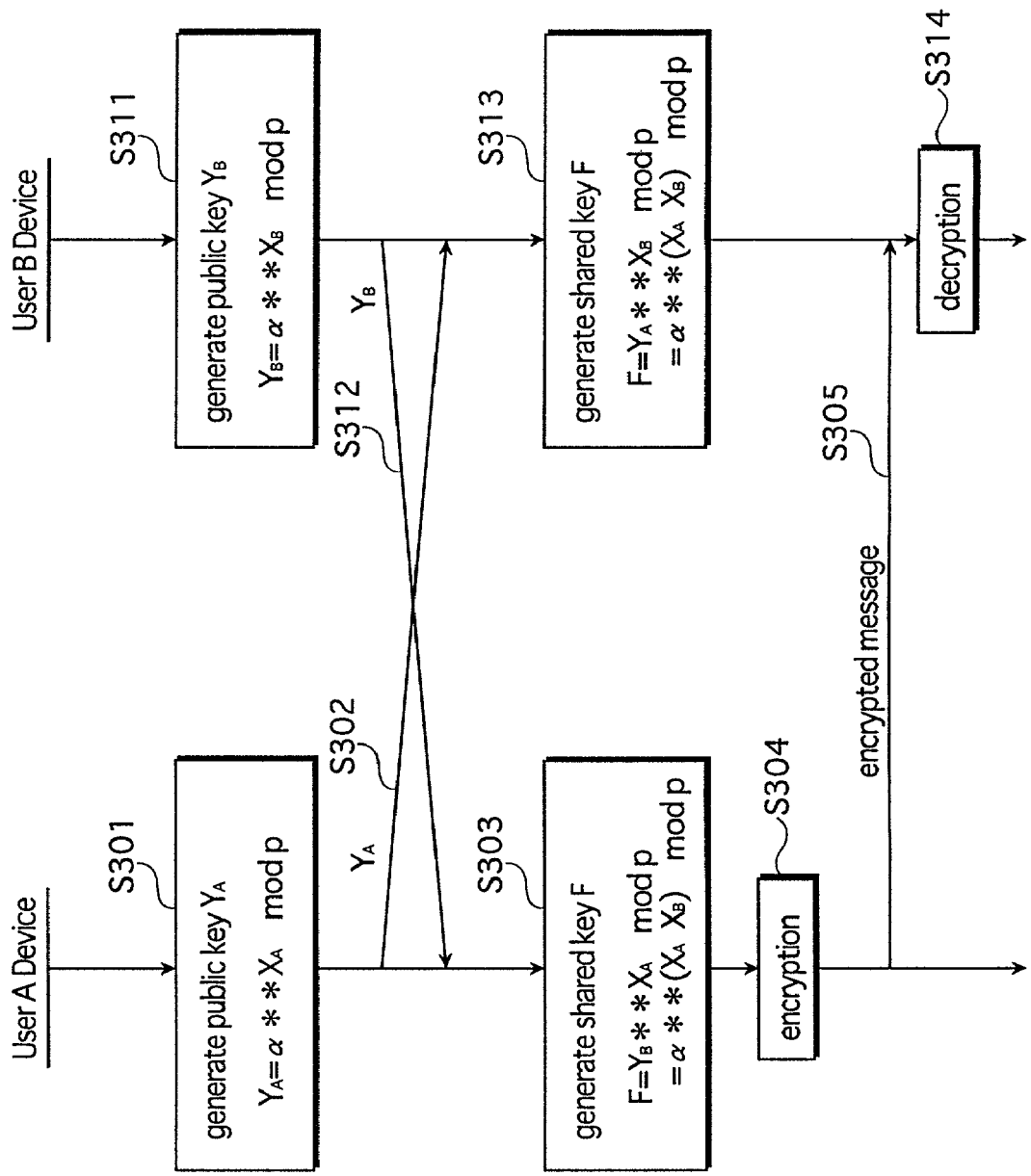
FIG. 10 is a flowchart showing the key sharing operations conducted by key sharing system 1b.

The operation of system 1b is described with reference to the flowchart in FIG. 10.

Key generation unit 11b reads secret key $X_A$ from key storage unit 13b and uses the read secret key $X_A$ to generate public key $Y_A$ such that:

$$Y_A \alpha = \alpha ** X_A \bmod p \text{ (step S301)}$$

Unit 11b then sends the generated public key $Y_A$ to user B device 30b via transmitter-receiver unit 12b and the Internet 2 (step S302).

Key generation unit 32b reads secret key $X_B$ from key storage unit 34b and uses the read secret key $X_B$ to generate public key $Y_B$ such that:

$$Y_B = \alpha ** X_B \bmod p \text{ (step S311)}$$

Unit 32b then sends the generated public key $Y_B$ to user A device 10b via transmitter-receiver unit 31b and the Internet 2 (step S312).

Next, key generation unit 11b receives transmission of public key $Y_B$ from device 30b via the Internet 2 and transmitter-receiver unit 12b, and uses the received public key $Y_B$ to generate shared key F such that:

$$F = Y_B ** X_A \bmod p$$

Unit 11b then writes the generated shared key F into key storage unit 13b (step S303).

Next, key generation unit 32b receives transmission of public key $Y_A$ from device 10b via the Internet 2 and transmitter-receiver unit 31b, and uses the received public key $Y_A$ to generate shared key F such that:

$$F = Y_A ** X_B \bmod p$$

Unit 32b then writes the generated shared key F into key storage unit 34b (step S313).

Next, encryption unit 14b reads the message from message storage unit 15b and shared key F from key storage unit 13b, generates the encrypted message derived from shared key F by implementing the encryption algorithm (step S304), and then transmits the encrypted message to device 30b via transmitter-receiver unit 12b and the Internet 2 (step S305).

Next, decryption unit 33b receives transmission of the encrypted message from device 10b via the Internet 2 and transmitter-receiver unit 31b, reads shared key F from key storage unit 34b, and generates the decrypted message derived from shared key F by implementing the decryption algorithm with respect to the encrypted message (step S314).

2.3 Detailed Structure of User A Device 10b

The following detailed description relates to user A device 10b, and focuses particularly on the structure of modular exponentiation unit 16b.

Unit 16b as described below performs a modular exponentiation $A**k \bmod p$, and assigns the result of the operation to variable X.

Since unit 16b is similar in structure to elliptic curve exponentiation unit 14 in user A device 10, the description will focus on the differences between the two units.

Also, since modular exponentiation unit 36b in device 30b is structurally related to unit 16b in device 10b, a description of unit 36b has been omitted. CPU 101

In order to perform the modular exponentiation $A**k \bmod p$, CPU 101 executes the following initial procedure.

CPU 101 calculates $A3, A5, \ldots, A(2m-1) \bmod p$, and assigns the results of A, $A3, A5, \ldots, A(2m-1) \bmod p$ to $A_0, A_1, A_2, \ldots, A_{m-1}$, respectively.

DMA Control Unit 106

Unit 106 sets the value of variable $B_1$ such that $B_1=1$ if $k'_i=0$.

Control Unit 401

On receipt of the initialization instruction, unit 401 sets the value of variable X stored in RAM 403 to 1, and the value of variable $B_2$ stored in memory unit 402 to 1.

Calculation Unit 404 On receipt of the calculation instruction, unit 404 reads variable X from RAM 403, calculates $X**2 \bmod p$, and overwrites variable X with the result. Unit 404 then reads variable X from RAM 403, calculates $X \times B_2 \bmod p$, and overwrites variable X with the result.

2.4 Detailed Operation of User A Device 10b

Figure 11:
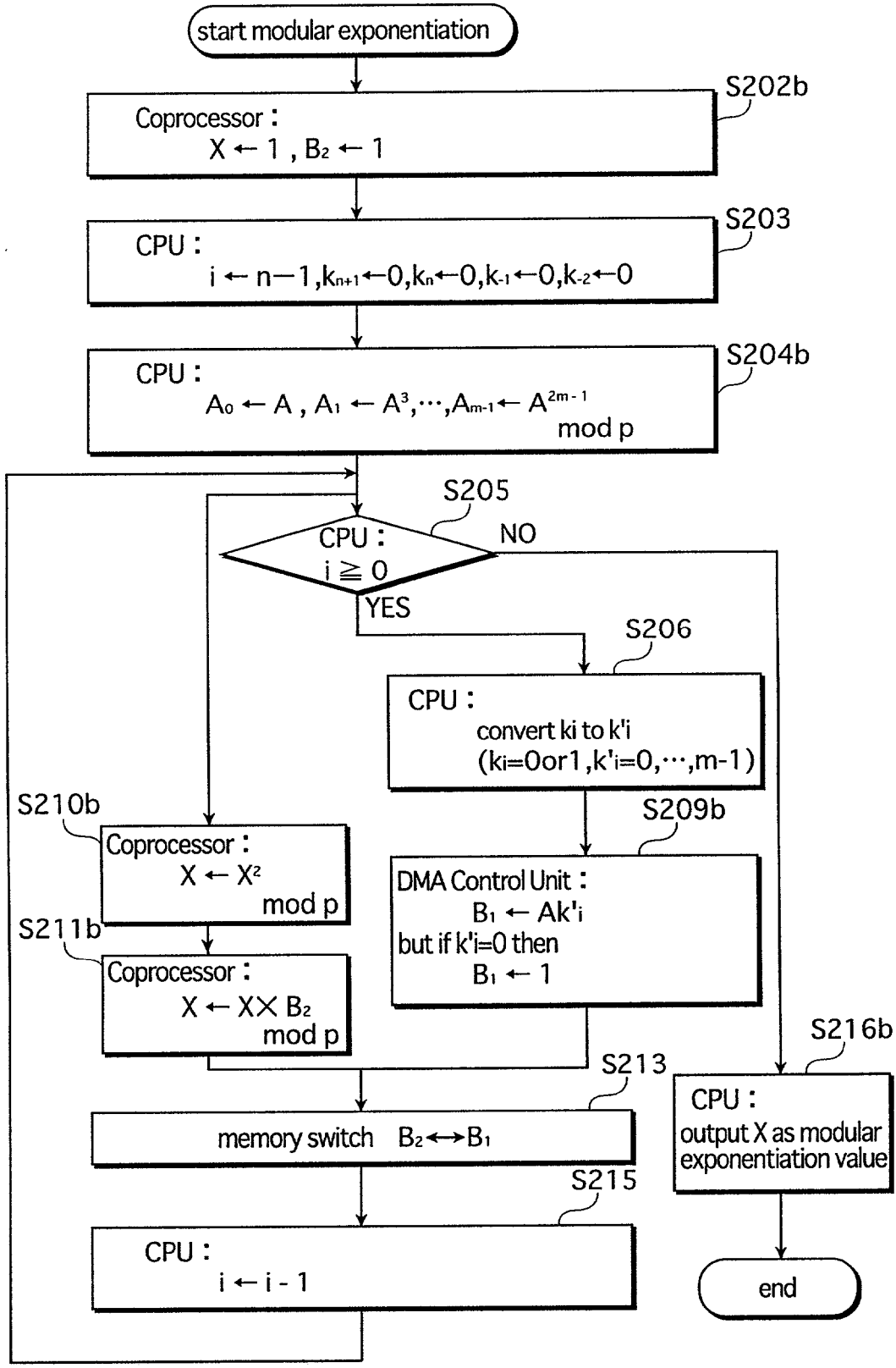
FIG. 11 is a flowchart showing the operations when modular exponentiation is performed in key sharing system 1b.

The following detailed description relates the operation of user A device 10b, and focuses in particular the operation of modular exponentiation unit 16b, with reference to the flowchart in FIG. 11.

Since the FIG. 11 flowchart is similar to the FIG. 5 flowchart the description will focus on the differences between the two flowcharts.

On receipt of the initialization instruction, control unit 401 sets the value of variable X stored in RAM 403 to 1 and the value of variable $B_2$ stored in memory unit 402 to 1 (step S202b) CPU 101 allocates an area in RAM 102 for storing variables $A_0, A_1, A_2, \ldots, A_{m-1}$, calculates m=$2^{w-1}$ and A3, A5, ..., A*(2m−1) mod p, and assigns the results of A, A3, A5, ..., A**(2m−1) mod p respectively to $A_0, A_1, A_2, \ldots, A_{m-1}$ stored in RAM 102 (step S204b)

DMA control unit 106 sets the value of variable $B_1$ stored in memory unit 402 of coprocessor 40 by transferring A k'$_i$ stored in RAM 102 to memory unit 402 via data bus 111 and address bus 112. However, if k'$_i$=0, then $B_1$=1 (step S209b).

Calculation unit 404 calculates X=X**2 mod p (step S210b) and X=X×$B_2$ mod p (step S211b).

3. Summary

As described above in relation to the present invention per the embodiments, a relatively large table as required by the small window method is generated outside of the coprocessor, and the selection and transfer of data included in the table is conducted in parallel with the calculations performed in the coprocessor. Furthermore, so as to prevent bottlenecks from occurring in the data transfer between the CPU and the coprocessor, two banks are included in the coprocessor for use in the calculations.

The modular exponentiation device of the present invention calculates $A^k$ mod p where p and k are specified positive integers and A is a positive integer less than p.

Furthermore, the device includes the following units: an operand parameter storage unit for storing one or more operand parameters that are based on A and p; first and second operand storage units for storing operands; an intermediate value storage unit for storing an intermediate value; an intermediate value initialization unit for setting the intermediate value as an initial value; an operand selection unit for scanning k in descending order and selecting as an operand from the operand parameter storage unit an operand parameter corresponding to a section of the bit pattern of k; an operand transfer unit for (i) reading the selected operand from the operand parameter storage unit, and (ii) transferring the read operand to one of the two operand storage units; an intermediate value renewal unit for (i) reading an operand from the operand storage unit that did not receive transfer of the operand from the operand transfer unit, (ii) reading the intermediate value from the intermediate value storage unit, and (iii) writing into the intermediate value storage unit the result of a predetermined arithmetic operation on p and the read intermediate value; an operand switching unit for switching the functions of the two operand storage units; a parallel processing control unit for controlling the operand selection unit and the operand transfer unit to transfer, in parallel with the arithmetic operation performed by the intermediate value renewal unit, the operand to be used in the following arithmetic operation; and a calculation result output unit for outputting as the calculation result the value stored in the intermediate value storage unit when all the calculations involving k have been completed.

In this construction, it is desirable for access to the table to be limited to the operand selection unit and the operand transfer unit. Further, it is desirable for the intermediate value renewal unit to only have access to a restricted amount of the memory of the first and second operand storage units and the intermediate value storage unit.

According to the present invention, it is possible to perform high-speed exponentiation operations while at the same time reducing the access capacity of the coprocessor. A high-speed operating frequency is achieved by providing two calculation result storage units in the coprocessor and interchanging their functions. This effectively allows data transfer between the CPU and the coprocessor to be conducted in parallel with the execution of the arithmetic operation by the coprocessor.

When the bit width used in the calculations is increased in order to improve the security of the system, the data volume requirements in the coprocessor need only increase by an amount equal to the memory taken to store the additional bit width in the operand storage units and the intermediate value storage unit, since any increase in table size is accommodated by the CPU. This structure thus enables high-speed modular exponentiation to be conducted by a coprocessor having minimal circuitry.

4. Variations of the Embodiments

Although described in terms of the above embodiments, the present invention is not limited to these embodiments, and the following variations are therefore applicable.

(1) In addition to modular exponentiation operations, it is also possible to perform non-modular exponentiation operations in modular exponentiation unit 16b in user A device 10.

Figure 12:
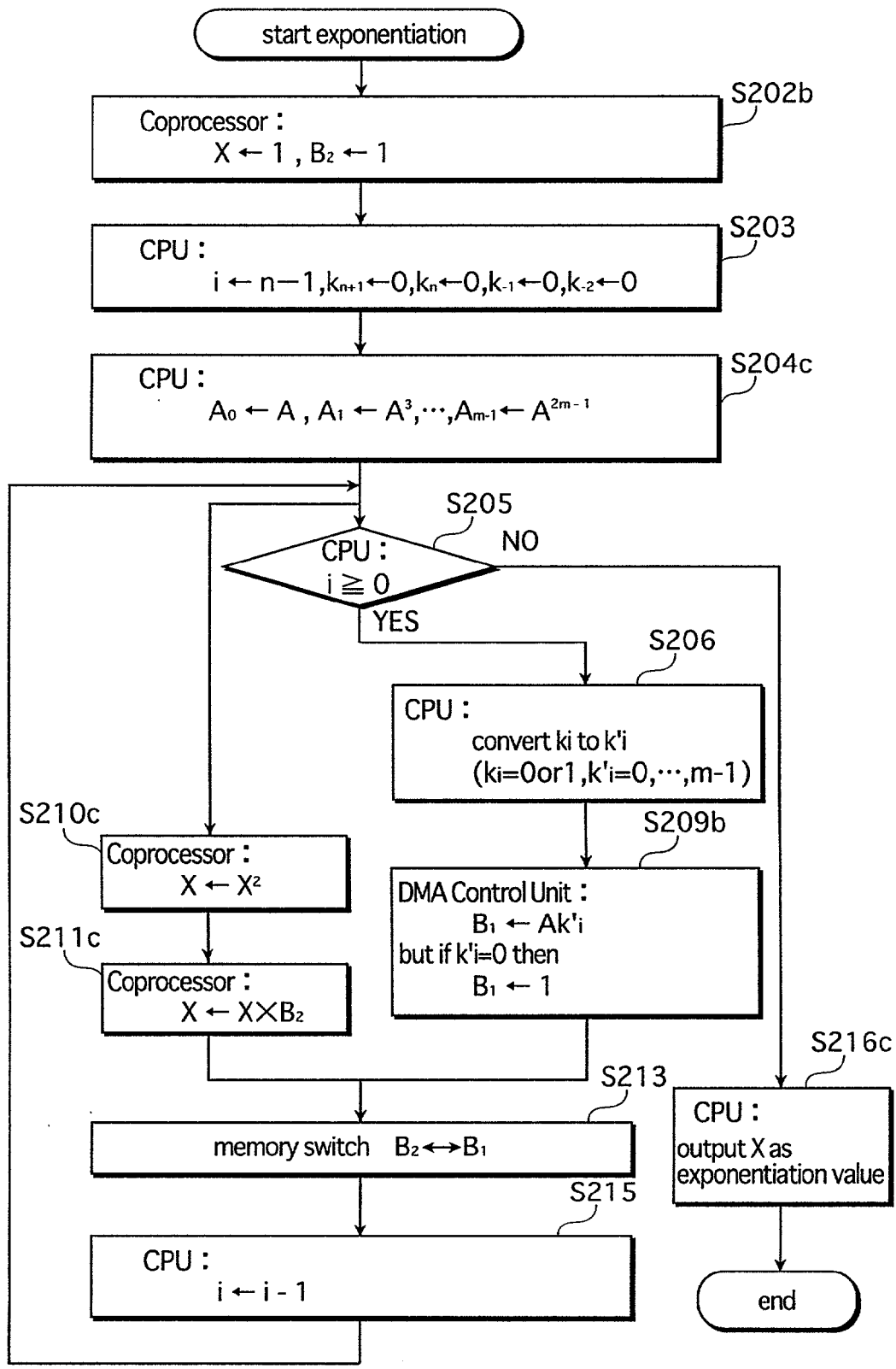
FIG. 12 is a flowchart showing the exponentiation operations performed by a device according to yet another embodiment of the present invention.

This variation is described below with reference to the flowchart in FIG. 12. As FIG. 12 is similar to FIG. 11, the description will focus on the differences.

CPU 101 allocates an area in RAM 102 for storing variables $A_0, A_1, A_2, \ldots, A_{m-1}$, calculates m=$2^{w-1}$ and A3, A5, ..., A(2m−1), and assigns the results of A, A3, A5, ..., A(2m−1) respectively to $A_0, A_1, A_2, \ldots,$) $A_{m-1}$, stored in RAM 102 (step S204c).

Calculation unit 404 calculates X=X**2 (step S210c) and X=X×$B_2$ (step S211c)

(2) According to the embodiments of the present invention, the exponentiation $A^k$ is performed by the coprocessor in a descending order of k. However, as shown below, it is possible for CPU 101 to perform the operation $A^k$ in an ascending of k in parallel with the descending order operation performed by the coprocessor. This variation is carried out as follows.

Here, k=[$k_{n-1}$ $k_{n-2}$ $k_{n-3}$ ... $k_0$] (where $k_{n-1}$, $k_{n-2}$, $k_{n-3}$, ..., $k_0$ are each either 0 or 1).

Exponent k is divided into (n−x) higher order bits and x lower order bits. Generated as a result is $k_H$ and $k_L$, where $k_H$ is formed from the (n−x) higher order bits and x number of zeros, and $k_L$ is formed from (n−x) number of zeros and the x lower order bits. $k_H$ and $k_L$ are thus represented as follows.

$$k_H=[k_{n-1}\ k_{n-2}\ k_{n-3}\ldots k_x\ 0\ 0\ \ldots\ 0]$$

$$k_L=[0\ 0\ \ldots\ 0\ k_{x-1}\ \ldots\ k_0]$$

A$k_H$ is calculated according to the above embodiments. On the other hand, A$k_L$ is calculated by CPU 101 during a non−use period of the CPU. CPU 101 also calculates Ak=A$k_H$×$_A$**$k_L$.

Figure 13:
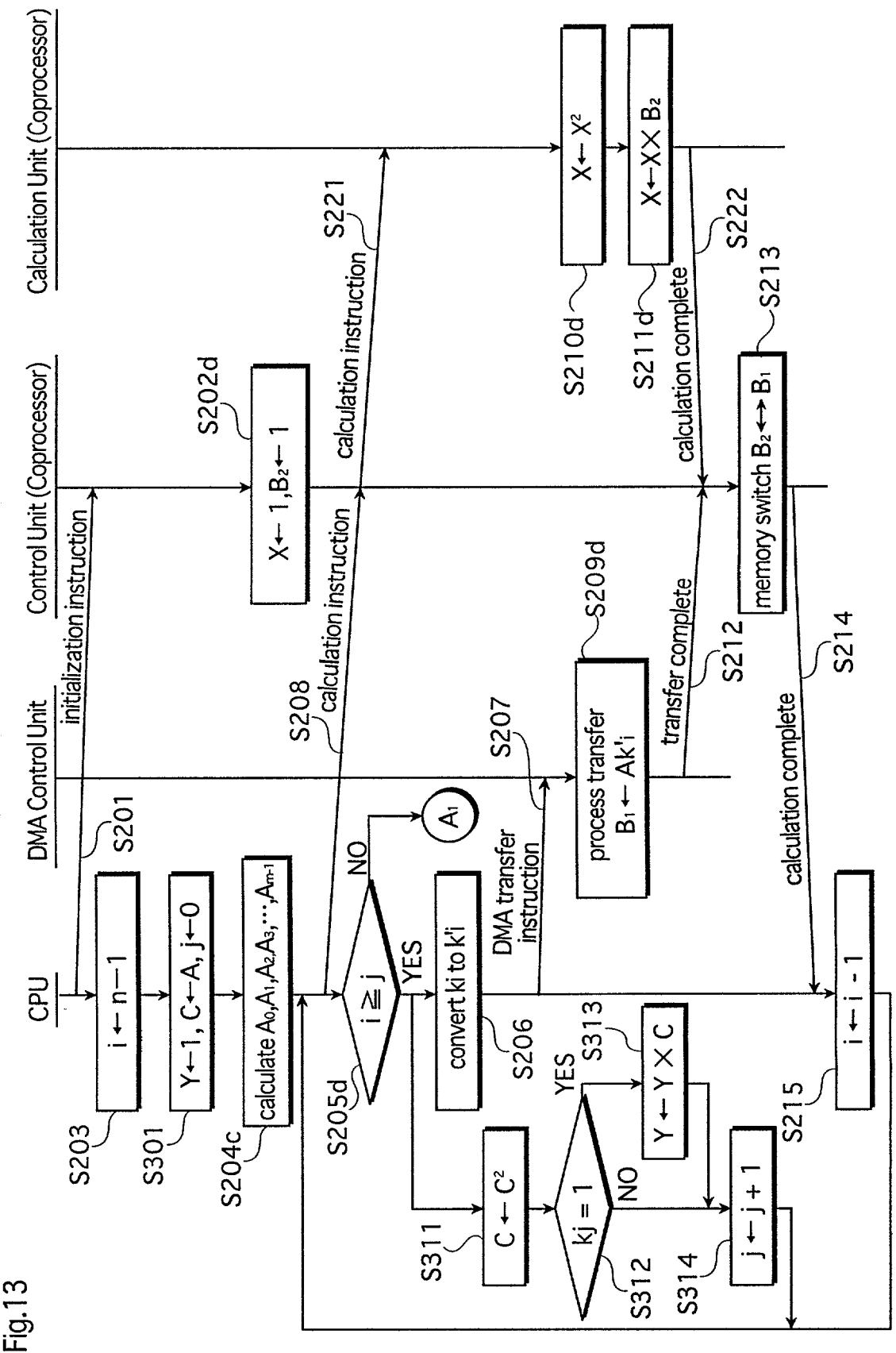
FIG. 13 is a flowchart showing the exponentiation operations performed by a device according to still yet another embodiment of the present invention (continued in FIG. 13)
Figure 14:
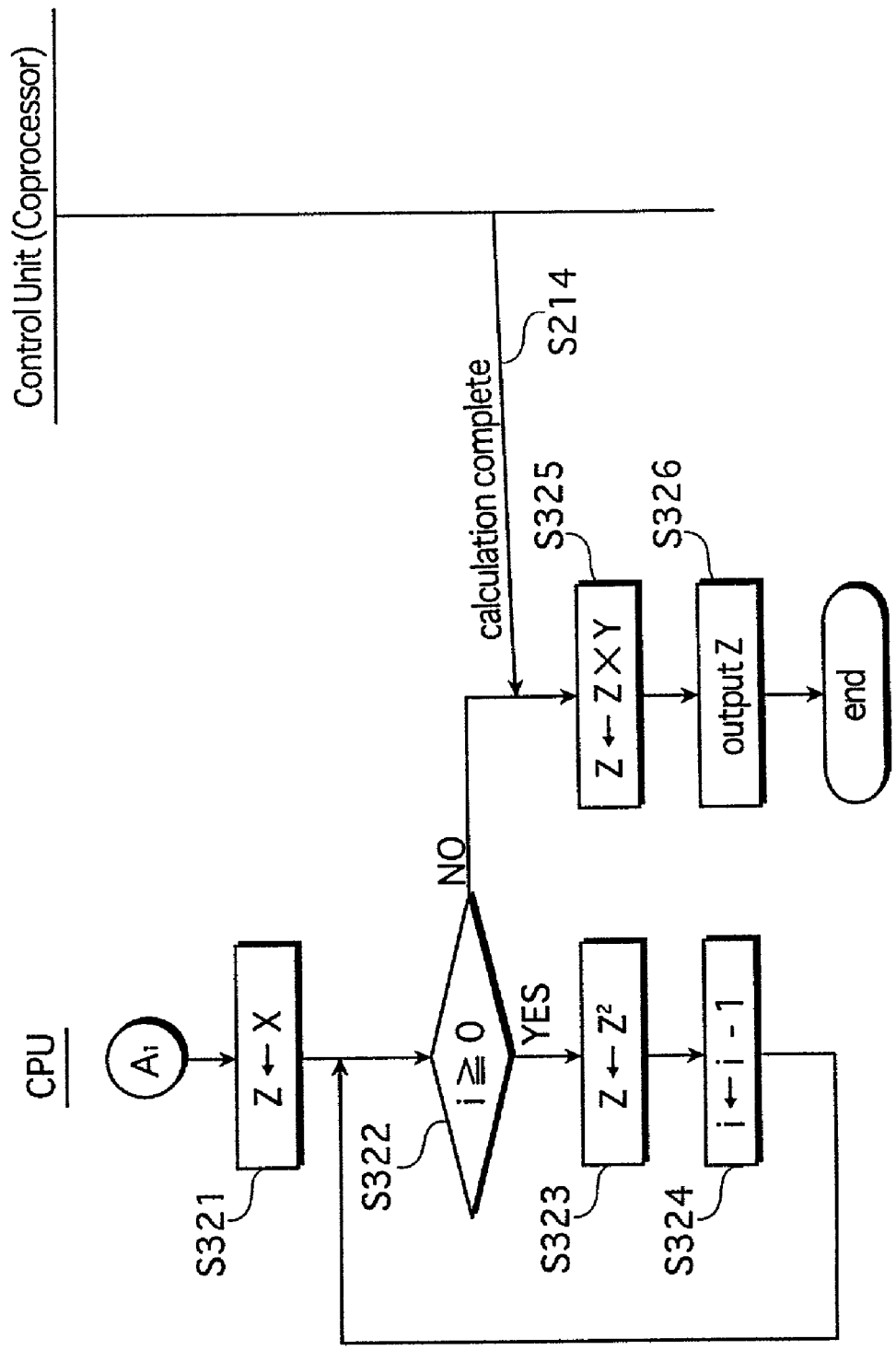
FIG. 14 is a continuation of the flowchart shown in FIG. 13.

Alternatively, it is possible to conduct the parallel processing in descending and ascending order of k without the initial division of k. In this case, the final calculation is performed when the same bit of k is reached during descending and ascending order calculations. This variation is described below with reference to the flowcharts in FIGS. 13 and 14.

CPU 101 outputs an initialization instruction to coprocessor 40 via data bus 111 and address bus 112 (step S201).

On receipt of the initialization instruction, control unit 401 sets the value of variable X stored in RAM 403 to 1, and the value of variable $B_2$ stored in memory unit 402 to 1 (step S202d).

CPU 101 assigns value n−1 to variable i and 0 to variables $k_{n+1}$, $k_n$, $k_{-1}$, $k_{-2}$ (step S203). CPU 101 also assigns 1 to variable Y, value A to a variable C, and 0 to a variable j (step S301). CPU 101 then allocates an area in RAM 102 for storing variables $A_0$, $A_1$, $A_2$, ..., $A_{m-1}$, calculates $m=2^{w-1}$ and A3, A5, ..., A(2m−1), and assigns the results of A, A3, A5, ..., A(2m−1) respectively to $A_0$, $A_1$, $A_2$, ..., $A_{m-1}$, stored in RAM 102 (step S204c)

CPU 101 then outputs a calculation instruction to coprocessor 40 via data bus 111 and address bus 112 (step S208).

Next, CPU 101 judges whether i≧j, and if "yes" (step S205d), then CPU 101 converts $k_i$ to $k'_1$ (step S206) and outputs a DMA transfer instruction to DMA control unit 106 via data bus 111 and address bus 112 (step S207).

On receipt of the DMA transfer instruction from CPU 101 (step S207), DMA control unit 106 sets the value of variable $B_1$ stored in memory unit 402 of coprocessor 40 by transferring A $k'_i$ stored in RAM 102 to memory unit 402 via data bus 111 and address bus 112 (step S209d). When $B_1$ has been set, unit 106 outputs a transfer completion notification to control unit 401 in coprocessor 40 (step S212)

On receipt of the calculation instruction (step S208), control unit 401 outputs a calculation instruction to calculation unit 404 (step S221). Calculation unit 404 then calculates X=X**2 (step S210d) and X=X×$B_2$ (step S211d), and outputs a calculation completion notification to control unit 401 when the calculations have been completed (step S222).

On receipt of the calculation completion notification and the transfer completion notification (steps S212 and S222), control unit 401 outputs a memory switch instruction to memory unit 402, and memory unit 402 switches to connection condition 2 if the current condition is connection condition 1, and to connection condition 1 if the current condition is connection condition 2 (step S213). Next, control unit 401 outputs a calculation completion notification to CPU 101 (step S214).

CPU 101 then subtracts 1 from variable i (step S215), and return to step S205d to repeat the process.

Again, if CPU 101 judges that i≧j (step S205d), then CPU 101 also calculates C=C**2 (step S311), and if $k_j$=1 (step S312), then CPU 101 calculates Y=Y×C (step S313), adds 1 to variable j (step 314), and returns to step S205d.

On the other hand, if CPU 101 judges that i<j (step S205d), then CPU 101 reads variable X stored in RAM 403 and assigns variable Z to variable X (step S321). If i≧0 (step S322), CPU 101 calculates Z=Z**2 (step S323), subtracts 1 from variable i (step S324), and returns to step S322 to repeat the process.

If i<0 (step S322), then CPU 101 receives a calculation completion notification from control unit 401 (step S214), calculates Z=Z×Y (step S325), writes variable Z into a specified area of RAM 102 as the result of the exponentiation k*A (step S326), and ends the calculation process.

(3) In digital signature system 1 as described in the above embodiments, CPU 101 calculates 3*A, 5*A, ..., (2m−1)*A. It is, however, possible for this calculation to have been completed beforehand and stored in RAM 102. This variation is also applicable to key sharing system 1b.

(4) It is possible for elliptic curve exponentiation and modular exponentiation to be applied in such systems using encryption technology as secret communication systems, authorization systems, key exchange systems, and the like.

A secret communication system allows for the transmission of a message without the content of the message being revealed to third parties.

An authorization system allows for (i) the verification of the sender, (ii) the authentication of the message, (iii) the verification of the receiver's access rights, (iv) the verification of the receiver, (v) and the validation of any agreements that might have been reached between parties concerned.

A key exchange system allows for the exchange of secret keys used in a secret key encryption system without the secret keys being revealed to third parties.

The security of these systems is based on the intractability of the discrete logarithm problem over finite fields and elliptic curves.

(5) As shown in the flowchart in FIG. 5, the conversion of $k_i$ to $k'_i$ according to the above embodiments is conducted prior to the arithmetic operations and DMA transfer performed in parallel by the coprocessor. However, it is possible for the conversion to be conducted after the arithmetic operations and DMA transfer performed by the coprocessor.

Also, as described in the above embodiments, the examination of the bits is conducted one bit at a time, although with the small window method bit patterns consisting of contiguous 0-value bits are bound to occur. In this case, it is possible to skip over the contiguous 0-value bits and perform a modular squaring operation on the number of bits skipped over.

Although according to the above embodiments it is necessary to conduct a DMA transfer of the operand, the transfer of the converted value of the exponent need not be conducted, which also means that the modular multiplication need not be performed.

Although the small window method was used in the examples given for the above embodiments, it is possible to use other methods such as the binary method or the comb method.

(6) It is possible to structure digital signature system 1 as described below.

According to the above embodiments as shown in FIG. 6, the value of A $k'_i$ as determined by $k'_i$, which results from the conversion of $k_i$ to $k'_i$ performed in CPU 101, is 0. Referring to the FIG. 6 flowchart, however, if "no" is the outcome of step S405 (i.e., a judgment involving a section of the bit sequence of k), then instead of outputting a DMA transfer instruction to DMA control unit 106, it is possible for CPU 101 to instruct coprocessor 40 to perform the following steps.

Specifically, instead of X=2*X (step S210) and X=X+$B_2$ (step S211), it is possible for CPU 101 to instructs coprocessor 40 to calculate X=2*X and X=X+0, and then on receipt of the calculation instruction, coprocessor 40 can performs the instructed calculations.

This variation is also applicable to key sharing system 1b.

(7) Although the structure of the present invention as described above includes a CPU, a RAM, and a coprocessor, the present invention is not limited to this structure and can be composed of any elements that perform a similar function. For example, a HD can replace the RAM, and a hardware accelerator can replace the coprocessor.

(8) A relatively large table can be generated outside of the coprocessor so as to enable high-speed exponentiation to be performed using the small window method. The selection of data from the table and transfer of data to the coprocessor can then be conducted in parallel with a multiple-length arithmetic operation performed in the coprocessor. So as to avoid bottlenecks occurring in the data transfer between the CPU and the coprocessor, two data banks can be provided in the coprocessor for storing the data to be used in the arithmetic operation. By providing two banks in the coprocessor, it is possible to use one for transferring data while data stored in the other is being used in the arithmetic operation. When the operation using the stored data has been completed, the banks can be switched, and the arithmetic operation then repeated using the newly transferred data while at the same time conducting data transfer in readiness for the following operation.

(9) The exponentiation $A^k$, the modular exponentiation $A^k$ over a finite field, and the elliptic curve exponentiation $k*A$ described above can be generalized as a power operation k & A. Also, the modular exponentiation operation over a finite field is one form of a modular exponentiation operation over a residue field.

The exponentiation $A^k$ and the modular exponentiation $A^k$ over a finite field are each formed from k repetitions of a multiplication operation using element A and the identity element value 1. The elliptic curve exponentiation $k*A$ is formed from k repetitions of an addition operation using element A and a zero element value 0. The multiplication and addition operations are both binary operations.

(10) It is possible for the present invention to be the method described above in the embodiments. It is also possible for the method to be a computer program executed by a computer. Alternatively, the method can be a digital signal composed of a computer program.

It is furthermore possible for the present invention to store a computer program or a digital signal on a computer readable storage medium, examples of which include a flexible disc, a hard disc, a CD-ROM, an MO, a DVD, a DVD-ROM, a DVD-RAM, and a semiconductor memory. Alternatively, the present invention can be the computer program or digital signal stored on the storage medium.

Also, it is possible for the present invention to transmit the computer program or the digital signal via a network such as a telecommunications circuit, a wireless communications circuit, a cable communications circuit, or the Internet.

It is further possible for the present invention to be a computer system that includes a memory and a microprocessor. In this variation, the memory can store the computer program, and the microprocessor can perform operations in accordance with the computer program.

Alternatively, it is possible for the present invention to be implemented by another computer system, this being achieved by sending the computer program or digital signal stored on the storage medium to the other computer system, or by sending the computer program or digital signal to the other computer system via the network.

(11) Furthermore, it is possible to provide a combination of any of the embodiments and variations described above.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A computerized implemented information security device for encrypting information, decrypting the encrypted information, generating a digital signature, and verifying the digital signature or sharing a key by performing a power operation k & A based on the intractability of the discrete logarithm problem in a group, the group being formed from a predetermined set and a binary operation performed using elements of the set, the power operation k & A involving k number of repetitions of the binary operation performed using the element A of the group and the identity element of the group, and the discrete logarithm problem being to determine the element k, when k exists, such that an element Y=k & A in the group, the device operating on bits of data comprising:

input unit for receiving inputs of the element k and the element A;

initializing unit for storing the identity element as an initial value in a variable X and a variable $B_2$;

repetition control unit for controlling a calculation unit, a storage unit, and an exchange unit to repeat, for the number of bits in a bit sequence of data resulting when the element k is represented in binary, a step composed of the respective operations of calculating, storing, and exchanging, so as to perform the power operation k & A, the result of the power operation k & A being stored in the variable X at the completion of the repetitions;

the calculation unit performs the binary operation using the variable X and the same variable X, performing the binary operation again using the initial binary operation result and an operand stored in the variable $B_2$, and storing the further binary operation result in the variable X;

the storage unit selects an operand to be used by the calculation unit in the following step and stores the selected operand in a variable $B_1$, the operation conducted by the storage unit being completed during a duration of the operation conducted by the calculation unit;

the exchange unit exchanges the operand in the variable $B_2$ for the operand in the variable $B_1$, when the operations conducted by the calculation unit and the storage unit have been complete;

a security unit for using, after the completion of the repetitions, the result of the power operation k & A being stored in the variable X to encrypt the information, decrypt the encrypted information, generate the digital signature, and verify the digital signature or share the key; and an output unit for outputting the encrypted information, the decrypted information, the digital signature, a result of the verification or the shared key.

2. The device of claim 1, wherein the storage means includes a candidate value storage unit for storing one or more candidate values that are smaller than a predetermined value, a selection unit for selecting one of the one or more stored candidate values as the operand to be used by the calculation unit in the following step, the selection being conducted using a section of the bit sequence of k, and a data storage unit for storing the selected operand in the variable $B_1$, the operation conducted by the data storage unit being completed during the duration of the operation conducted by the calculation unit.

3. The device according to claim 2, wherein
the one or more candidate values stored by the candidate value storage unit result from a power operation h & A where h is smaller than a predetermined value.

4. The device according to claim 3, wherein
the repetition control unit controls the step to be repeated in a descending order of the bit sequence of k.

5. The device according to claim 4, wherein
the selection unit prevents the selection of the operand when the section of the bit sequence of k conforms to a predetermined bit sequence pattern,
the data storage unit prevents the storage of a selected operand in the variable $B_1$, when the selection unit has prevented the selection of the operand, and
the calculation unit performs, in the following step when the data storage unit has prevented the storage of an operand in the variable $B_1$, the binary operation using the variable X and the same variable X, performs the binary operation again using the initial binary operation result and the identity element, and stores the further binary operation result in the variable K.

6. The device according to claim 4 being a computer system composed of a general-purpose processor, a specialized processor, a first memory, a bus, and a DMA control unit, wherein
the general-purpose processor, the specialized processor, the first memory, and the DMA control unit are connected to each other via the bus,
the first memory includes a region for storing a computer program, the element k, the element A, and an operand,
the specialized processor includes the calculation unit, the exchange unit, and a second memory for storing the variables $X_1$, $B_1$, and $B_2$,
the initializing unit initializes, via the bus, the variables X and $B_2$ stored in the second memory,
the repetition control unit controls the step to be repeated,
the storage unit transfers, via the bus and under the control of the DMA control unit, the operand stored in the first memory to the variable $B_1$, stored in the second memory, and
the operations conducted by the initializing unit, the repetition control unit, and the storage unit are executed by the general-purpose processor in accordance with the computer program.

7. The device according to claim 6, wherein
the repetition control unit controls the step to be repeated for the higher order bits of the bit sequence of k, and
the device further comprises:
a binary method calculation unit for applying a binary method to perform, in ascending order of the bit sequence of k, a lower order power operation using the lower order bits of the bit sequence, the result of the lower order power operation being stored in a variable Z in the first memory; and
a binary operation unit for calculating the result of the power operation k & A by performing a binary operation using the variables X and Z,
the operations conducted by the binary method calculation unit and the binary operation unit being executed by the general-purpose processor in accordance with the computer program.

8. The device according to claim 4, wherein the group is an elliptic curve,
the identity element is a zero element, being a point at infinity above the elliptic curve,
the power operation k & A is a multiplication k×A on the elliptic curve,
the binary operation is an addition on the elliptic curve,
the discrete logarithm problem is to determine k, when k exists, such that Y=k×A on the elliptic curve,
the initializing unit stores the zero element in the variables X and $B_2$,
the repetition control unit controls the step to be repeated for the bit number of k so as to perform the multiplication k×A, the result of the multiplication k×A being stored in the variable X at the completion of the repetitions, and
the calculation unit performs the addition using the variable X and the same variable X, performs the addition again using the initial addition result and the operand stored in the variable $B_2$, and stores the further addition result in the variable X.

9. The device according to claim 4, wherein
the group is a residue field,
the identity element is an integer having a value of 1,
the power operation k & A is an exponentiation $A^k$ over the residue field,
the binary operation is a multiplication over the residue field,
the discrete logarithm problem is to determine k, when k exists, such that $Y=A^k$ over the residue field,
the initializing unit stores the integer 1 in the variables X and $B_2$,
the repetition control unit controls the step to be repeated for the bit number of k so as to perform the exponentiation $A^k$, the result of the exponentiation $A^k$ being stored in the variable X at the completion of the repetitions, and,
the calculation unit performs the multiplication using the variable X and the same variable X, performs the multiplication again using the initial multiplication result and the operand stored in the variable $B_2$, and stores the further multiplication result in the variable X.

10. The device according to claim 4, wherein
the group is a natural number field,
the identity element is an integer having a value of 1,
the power operation k & A is an exponentiation $A^k$ over the natural number field,
the binary operation is a multiplication over the natural number field,
the discrete logarithm problem is to determine k, when k exists, such that $Y=A^k$ over the natural number field,
the initializing unit stores the integer 1 in the variables X and $B_2$,
the repetition control unit controls the step to be repeated for the bit number of k so as to perform the exponentiation $A^k$, the result of the exponentiation $A^k$ being stored in the variable X at the completion of the repetitions, and
the calculation unit performs the multiplication using the variable X and the same variable X, performs the multiplication again using the initial multiplication result and the operand stored in the variable $B_2$, and stores the further multiplication result in the variable X.

11. The device according to claim 4 performing the power operation k & A in order to encrypt or decrypt the predetermined information.

12. The device according to claim 4 performing the power operation k & A in order to generate or verify at digital signature in the predetermined information.

13. The device according to claim 4 performing the power operation k & A in order to safely share a key with another device.

14. A computerized implemented information security method used by an information security device for encrypting information, decrypting the encrypted information, generating a digital signature, and verifying the digital signature or sharing a key by performing a power operation k & A based on the intractability of the discrete logarithm problem in a group, the device including initializing unit, repetition control unit, calculation unit storage unit, and exchange unit, the group being formed from a predetermined set and a binary operation performed using elements of the set, the power operation k & A involving k number of repetitions of the binary operation performed using the element A of the group and the identity element of the group, and the discrete logarithm problem being to determine the element k, when k exists, such that an element Y=k & A in the group, the method operating upon bits of data comprising:

inputting values for the element k and the element A;

an initializing step for having the initializing unit store the identity element as an initial value in a variable X and a variable $B_2$;

a repetition control step for having the repetition control means control the calculation unit, the storage unit, and the exchange unit to repeat, for the number of bits in a bit sequence of data resulting when the element k is represented in binary, a step composed of the respective operations of calculating, storing, and exchanging, so as to perform the power operation k & A, the result of the power operation k & A being stored in the variable X at the completion of the repetitions, wherein the calculation unit performs the binary operation using the variable X and the same variable X, performs the binary operation again using the initial binary operation result and an operand stored in the variable $B_2$, and stores the further binary operation result in the variable X, the storage unit selects an operand to be used by the calculation means in the following step and stores the selected operand in a variable $B_1$, the operation conducted by the storage means being completed during a duration of the operation conducted by the calculation means, and the exchange unit exchanges the operand in the variable $B_2$ for the operand in the variable $B_1$, when the operations conducted by the calculation unit and the storage unit have been completed;

using, after the completion of the repetitions, the result of the power operation k and A being stored in the variable X to encrypt the information, decrypt the encrypted information, generate the digital signature, and verify the digital signature or share the key; and outputting the encrypted information, the decrypted information, the digital signature, a result of the verification or the shared key.

15. A computer-readable storage medium storing an information security program used by an information security device that securely and reliably manages predetermined information based on the intractability of the discrete logarithm problem in a group by performing a power operation k & A, the device including initializing unit, repetition control unit, calculation unit, storage unit, exchange unit, security unit and an output unit, the group being formed from a predetermined set and a binary operation performed using elements of the set, the power operation k & A involving k number of repetitions of the binary operation performed using the element A of the group and the identity element of the group, and the discrete logarithm problem being to determine the element k, when k exists, such that an element Y=k & A in the group, the program comprising:

a storing step for storing inputted values for the element k and the element A;

an initializing step for having the initializing unit store the identity element as an initial value in a variable X and a variable $B_2$; and a repetition control step for having the repetition control unit control the calculation unit, the storage unit, and the exchange unit to repeat, for the number of bits in a bit sequence resulting when the element k is represented in binary, a step composed of the respective operations of calculating, storing, and exchanging, so as to perform the power operation k & A, the result of the power operation k & A being stored in the variable X at the completion of the repetitions, wherein the calculation unit performs the binary operation using the variable X and the same variable X, performs the binary operation again using the initial binary operation result and an operand stored in the variable $B_2$, and stores the further binary operation result in the variable AX, the storage unit selects an operand to be used by the calculation unit in the following step and stores the selected operand in a variable $B_1$, the operation conducted by the storage unit being completed during a duration of the operation conducted by the calculation unit, the exchange unit exchanges the operand in the variable $B_2$ for the operand in the variable $B_1$, when the operations conducted by the calculation unit and the storage unit have been completed;

the security unit for after the completion of the repetitions, uses the result of the power operation k & A being stored in the variable X to encrypt the information, decrypt the encrypted information, generate the digital signature, and verify the digital signature or share the key; and the output unit outputs the encrypted information, the decrypted information, the digital signature, a result of the verification or the shared key.

16. In a computerized implemented information security device for encrypting information, decrypting the encrypted information, generating a digital signature, and verifying the digital signature or sharing a key by performing a power operation k & A based on the intractability of the discrete logarithm problem in a group, the improvement comprising;

an exponentiation device for exponentiating $A^k$ over a natural number field, the discrete logarithm problem being to determine the element k, when k exists, such that an element $Y=A^k$ over the natural number field, the device comprising:

an input unit for receiving inputs of the element k and the element A;

an initializing unit for storing an integer value 1 as an initial value in a variable X and a variable $B_2$;

a repetition control unit for controlling calculation unit, storage unit, and exchange unit to repeat, for the number of bits in a bit sequence resulting when the element k is represented in binary, a step composed of the respective operations of calculating, storing, and exchanging, so as to perform the exponentiation $A^k$, the result of the exponentiation $A^k$ being stored in the variable X at the completion of the repetitions;

a calculation unit for performing the multiplication using the variable X and the same variable X, performing the multiplication again using the initial multiplication result and an operand stored in the variable $B_2$, and storing the further multiplication result in the variable X;

a storage unit for selecting an operand to be used by the calculation unit in the following step and storing the selected operand in a variable $B_1$, the operation conducted by the storage unit being completed during a duration of the operation conducted by the calculation unit;

the exchange unit for exchanging the operand in the variable $B_2$ for the operand in the variable $B_1$, when the operations conducted by the calculation unit and the storage unit have been completed;

a security unit for using, after the completion of the repetitions, the result of the power operation k & A being stored in the variable X to encrypt the information, decrypt the encrypted information, generate the digital signature, and verify the digital signature or share the key; and an output unit for outputting, the encrypted information, the decrypted information, the digital signature, a result of the verification or the shared key.

17. In a computerized implemented information security device for encrypting information, decrypting the encrypted information, generating a digital signature, and verifying the digital signature or sharing a key by performing a power operation k & A based on the intractability of the discrete logarithm problem in a group, the improvement comprising:

a modular exponentiation device for exponentiating $A^k$ over a residue field, the residue field being formed from a predetermined set and a multiplication over the residue field performed using elements of the set, the exponentiation $A^k$ involving k number of repetitions of the multiplication performed using the element A of the residue field and an integer value 1, and the discrete logarithm problem being to determine the element k, when k exists, such that an element $Y=A^k$ over the residue field, the device comprising:

input unit for receiving inputs of the element k and the element A;

initializing unit for storing the integer 1 as an initial value in a variable X and a variable $B_2$;

repetition control unit for controlling a calculation unit, a storage unit, and an exchange unit to repeat, for the number of bits in a bit sequence resulting when the element k is represented in binary, a step composed of the respective operations of calculating, storing, and exchanging, so as k to perform the exponentiation $A^k$, the result of the exponentiation $A^k$ being stored in the variable X at the completion of the repetitions;

the calculation unit performs the multiplication using the variable X and the same variable X, performing the multiplication again using the initial multiplication result and an operand stored in the variable $B_2$, and storing the further multiplication result in the variable X;

the storage unit provides an operand to be used by the calculation unit in the following step and storing the selected operand in a variable $B_1$, the operation conducted by the storage means being completed during a duration of the operation conducted by the calculation unit;

the exchange unit exchanges the operand in the variable $B_2$ for the operand in the variable $B_1$, when the operations conducted by the calculation unit and the storage unit have been completed;

security unit for using, after the completion of the repetitions, the result of the power operation k & A being stored in the variable X to encrypt the information, decrypt the encrypted information, generate the digital signature, and verify the digital signature or share the key; and output unit for outputting the encrypted information, the decrypted information, the digital signature, a result of the verification or the shared key.

18. In a computerized implemented information security device for encrypting information, decrypting the encrypted information, generating a digital signature, and verifying the digital signature or sharing a key by performing a power operation k & A based on the intractability of the discrete logarithm problem in a group, the improvement comprising;

an elliptic curve exponentiation device for multiplying k×A on an elliptic curve, the elliptic curve being formed from a predetermined set and an addition on the elliptic curve performed using elements of the set, the multiplication k×A on the elliptic curve involving k number of repetitions of the addition performed using the element A of the elliptic curve and a zero element, being a point at infinity above the elliptic curve, and, the discrete logarithm problem being to determine the element k, when k exists, such that an element Y=k×A on the elliptic curve, the device comprising:

input unit for receiving inputs of the element k and the element A;

initializing unit for storing the zero element as an initial value in a variable X and a variable $B_2$;

repetition control unit for controlling a calculation unit, a storage unit, and an exchange unit to repeat, for the number of bits in a bit sequence resulting when the element k: is represented in binary, a step composed of the respective operations of calculating, storing, and exchanging, so as to perform the multiplication k×A, the result of the multiplication k×A being stored in the variable X at the completion of the repetitions;

the calculation unit for performing the addition using the variable X and the same variable X, performing the addition again using the initial addition result and an operand stored in the variable $B_2$, and storing the further addition result in the variable X;

the storage unit for selecting an operand to be used by the calculation unit in the following step and storing the selected operand in a variable $B_1$, the operation conducted by the storage unit being completed during a duration of the operation conducted by the calculation unit; and the exchange unit for exchanging the operand in the variable $B_2$ for the operand in the variable $B_1$ when the operations conducted by the calculation unit and the storage unit have been completed;

security unit for using, after the completion of the repetitions, the result of the power operation k & A being stored in the variable X to encrypt the information, decrypt the encrypted information, generate the digital signature, and verify the digital signature or share the key; and output unit for outputting the encrypted information, the decrypted information, the digital signature, a result of the verification or the shared key.

* * * * *